Figure 1:
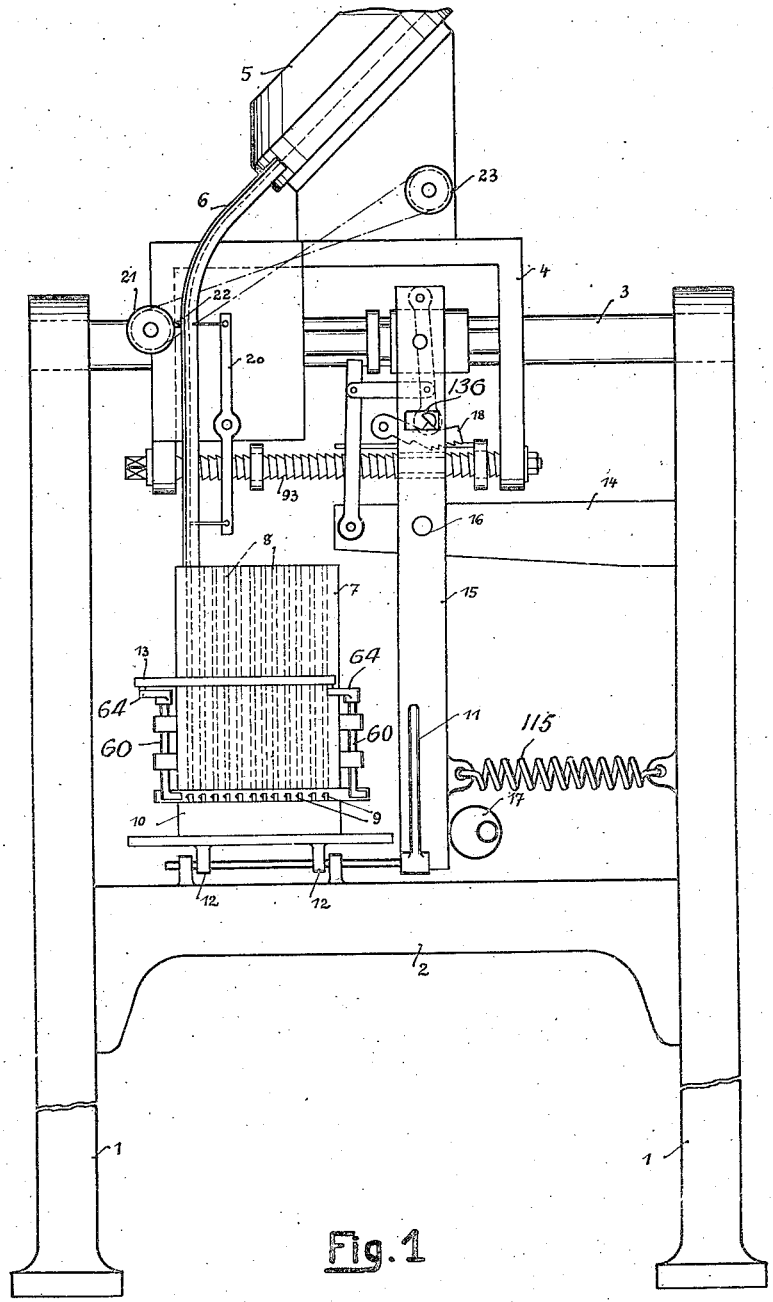

Sept. 8, 1936.  M. WINTERHALTER  2,053,544
METHOD OF AND APPARATUS FOR SUPPLYING SLIDING
CLASP FASTENER ELEMENTS TO STRINGERS
Filed March 28, 1932   26 Sheets-Sheet 1

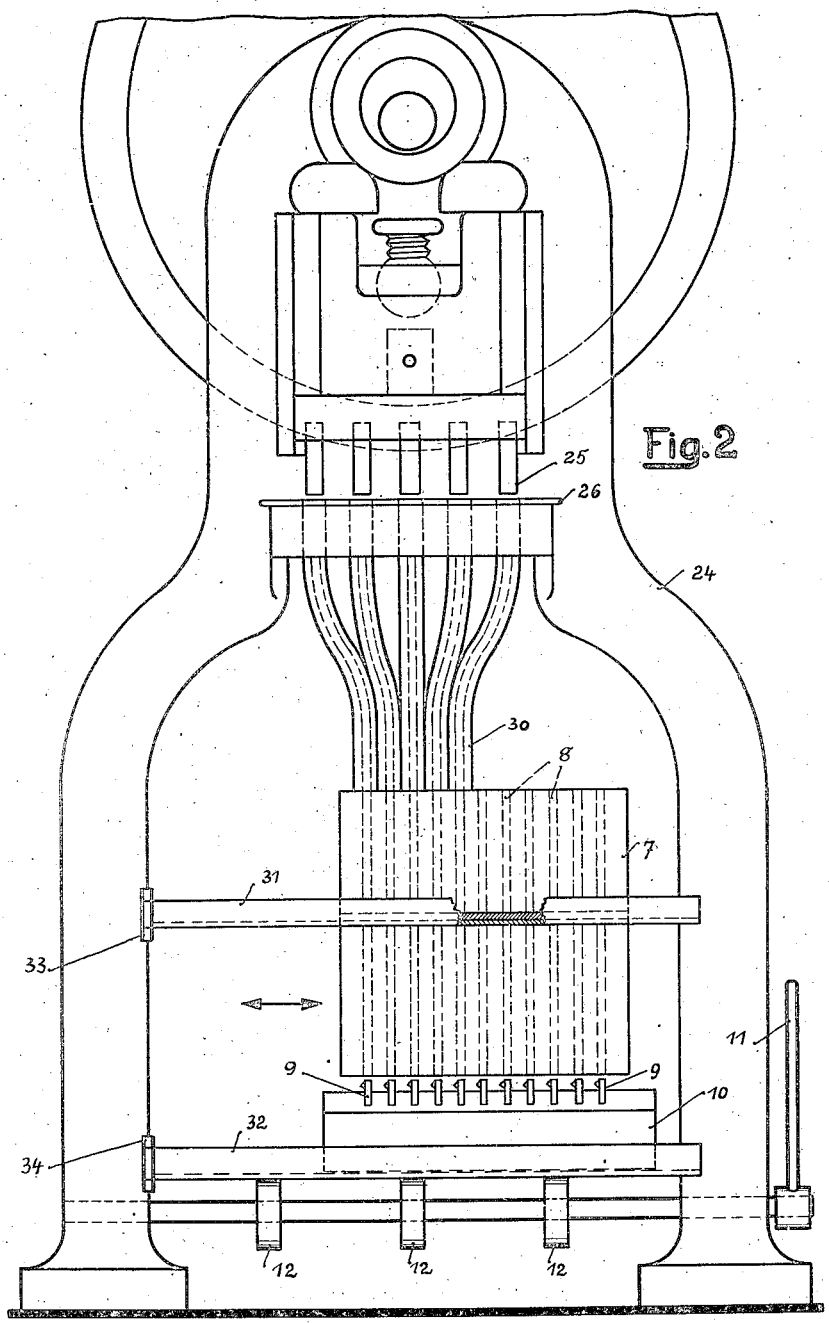

Sept. 8, 1936.   M. WINTERHALTER   2,053,544
METHOD OF AND APPARATUS FOR SUPPLYING SLIDING
CLASP FASTENER ELEMENTS TO STRINGERS
Filed March 28, 1932   26 Sheets-Sheet 3
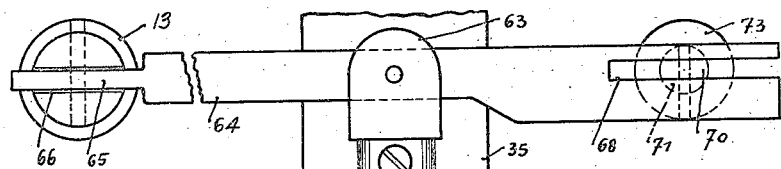
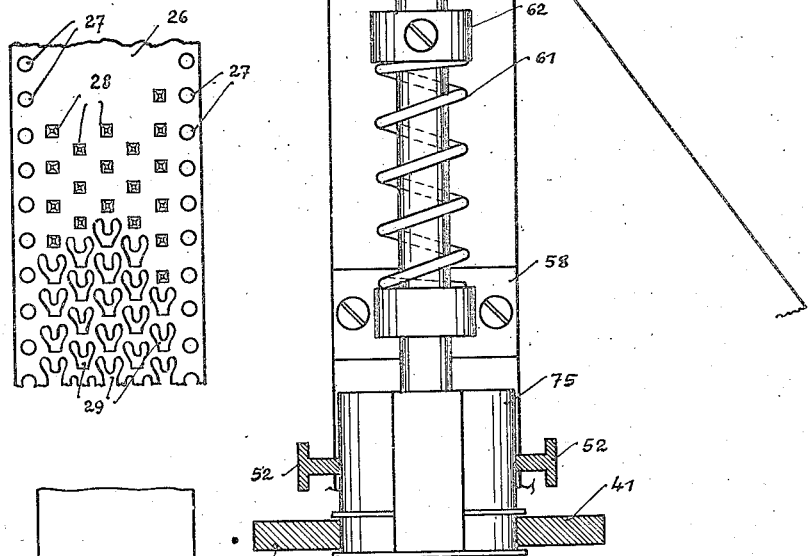
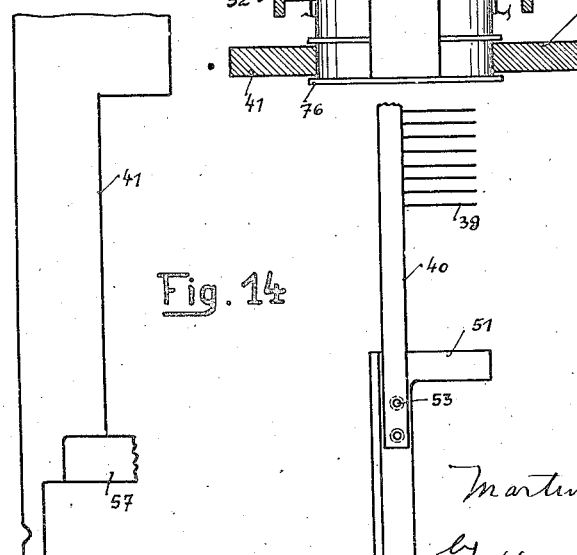

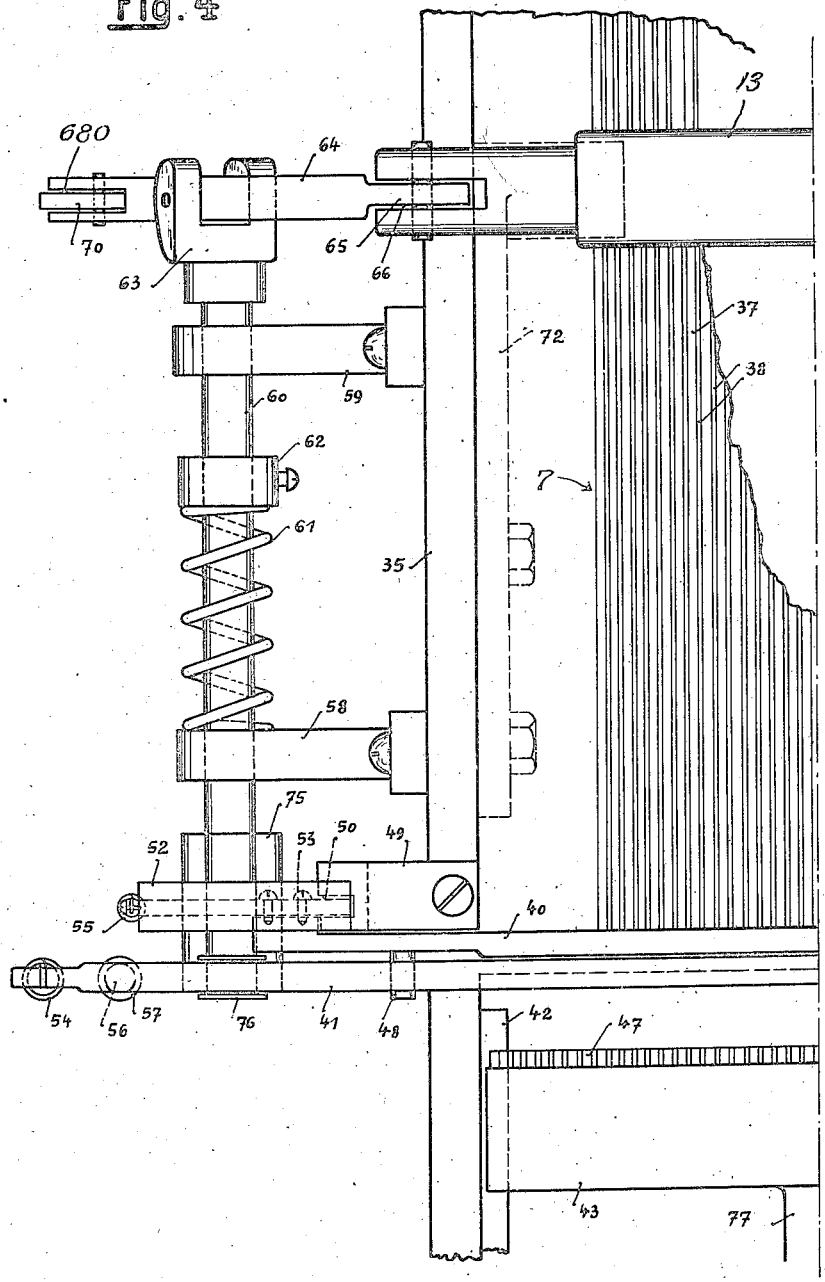

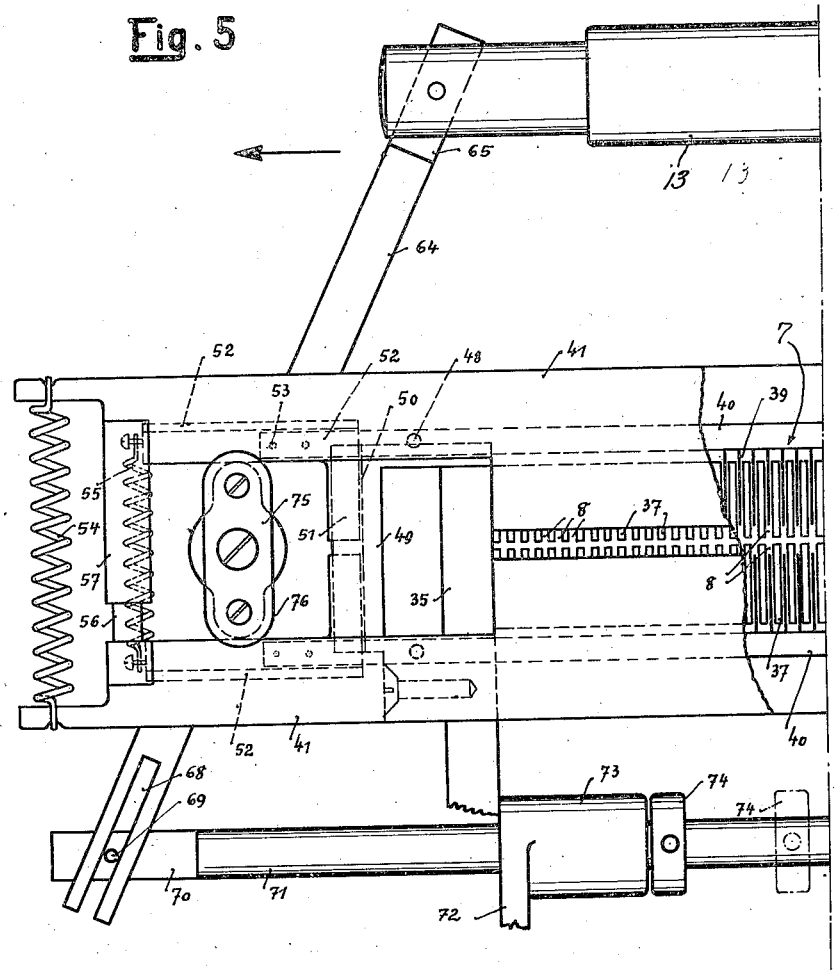

Sept. 8, 1936.                M. WINTERHALTER                2,053,544
         METHOD OF AND APPARATUS FOR SUPPLYING SLIDING
               CLASP FASTENER ELEMENTS TO STRINGERS
                    Filed March 28, 1932        26 Sheets-Sheet 6
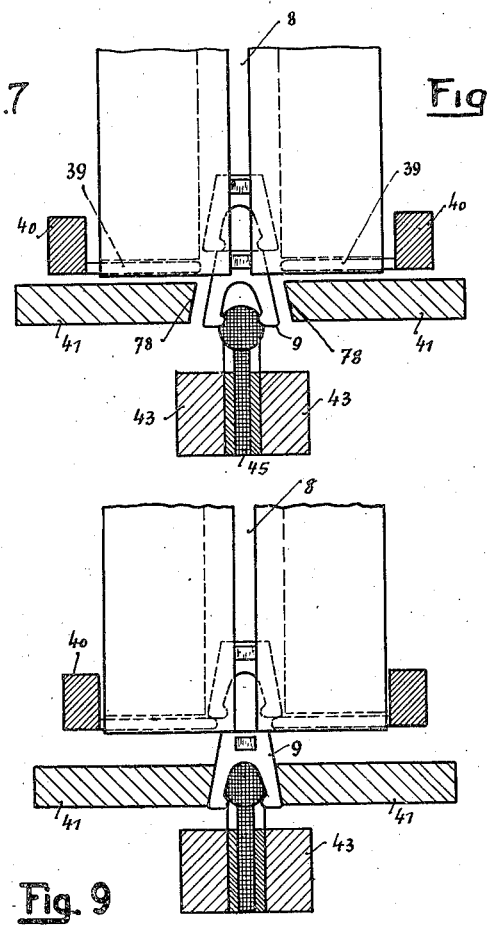
Fig.7
Fig.8
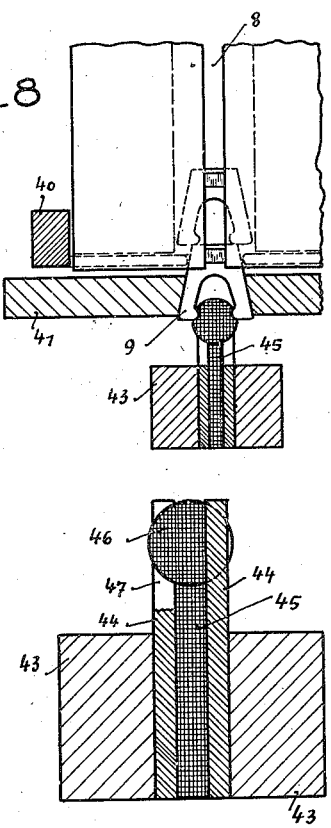
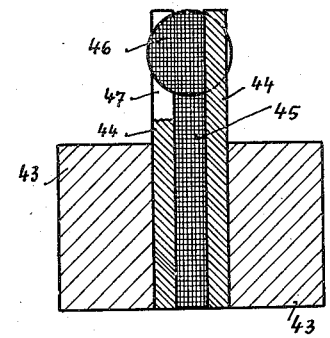
Fig.10
Fig.9
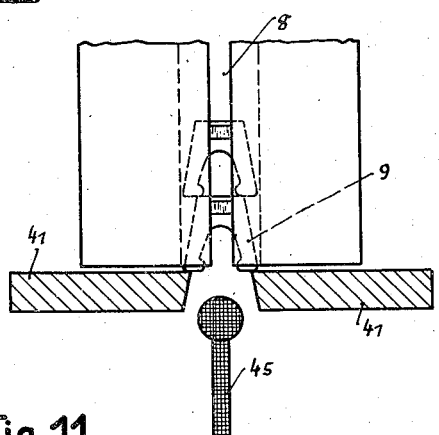
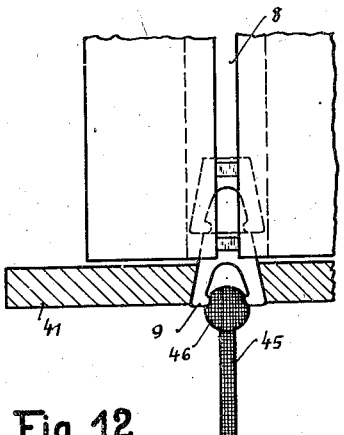
Fig.11
Fig.12

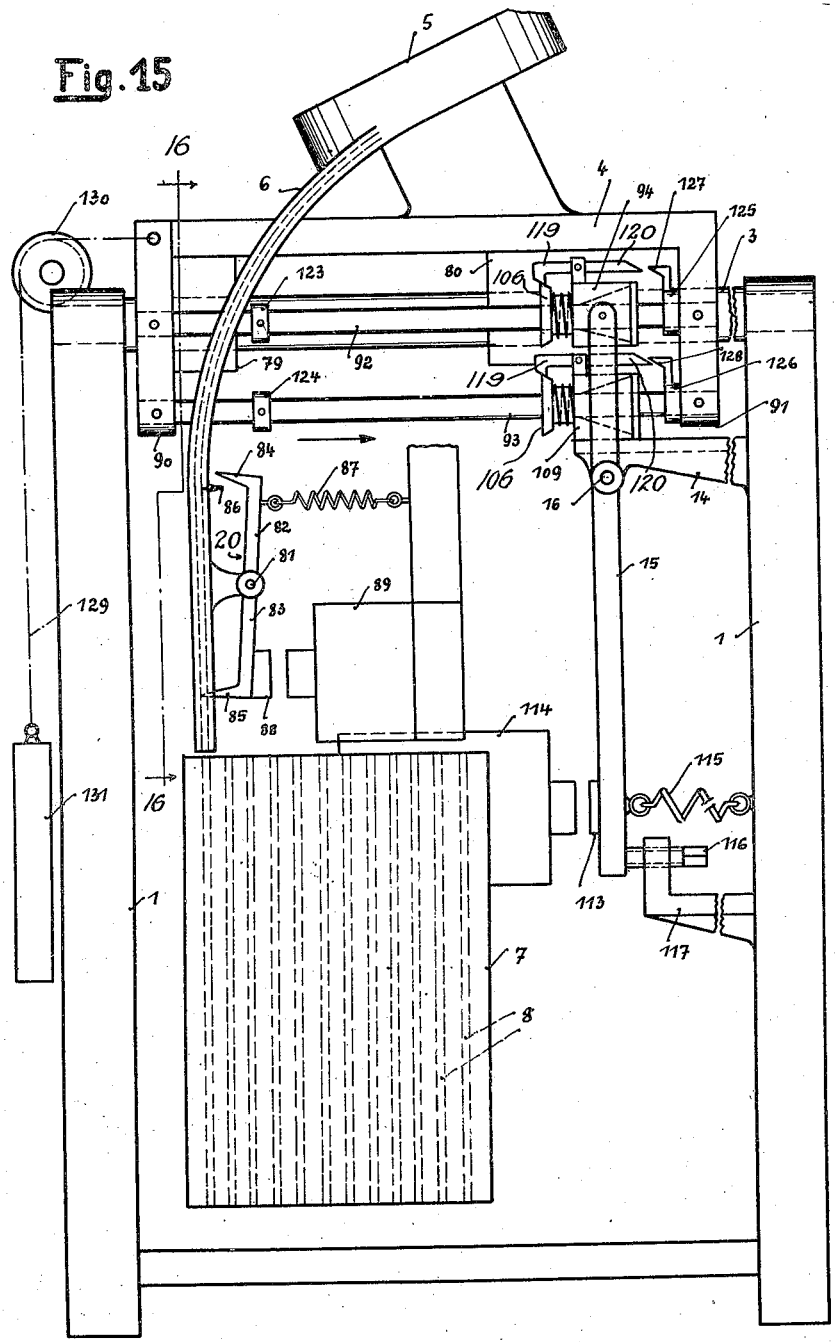

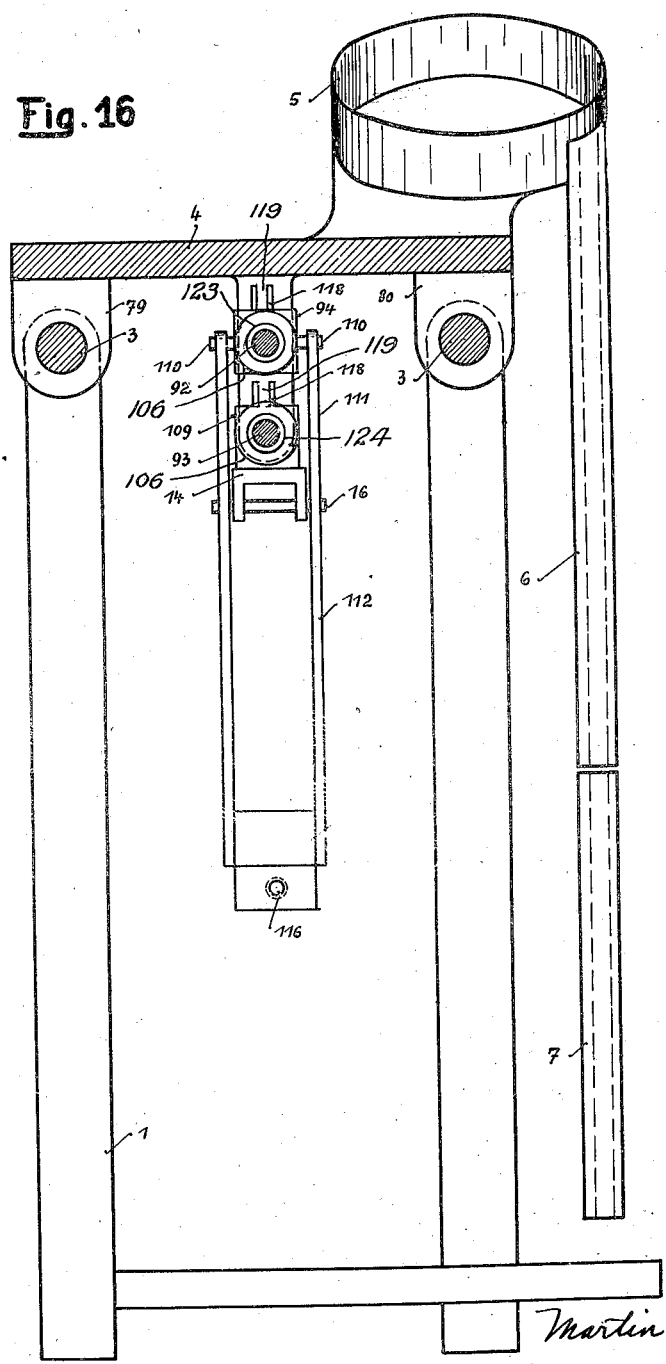

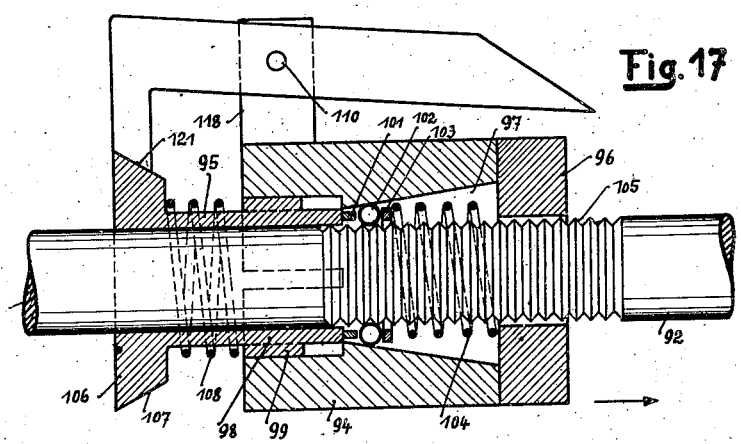
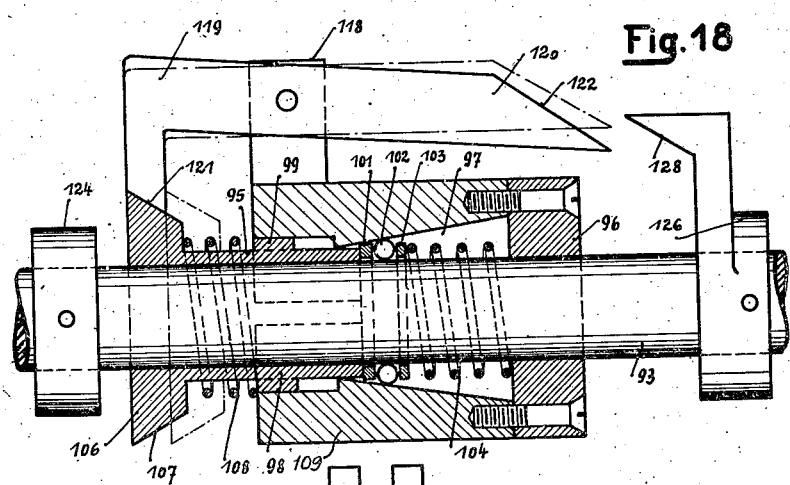
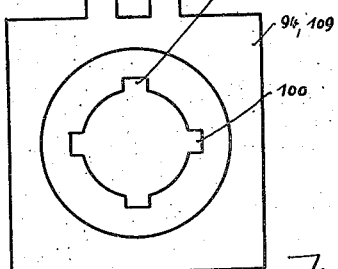

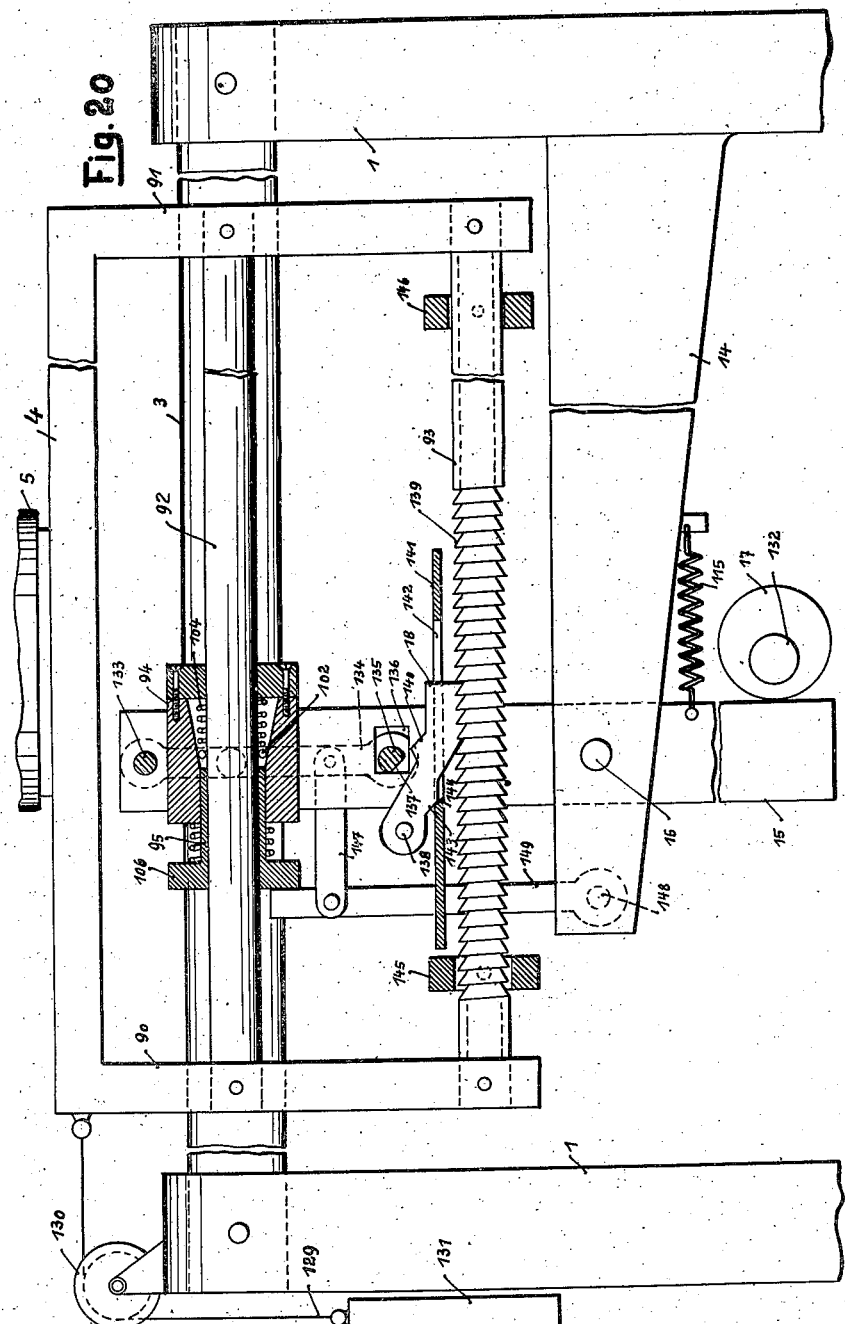

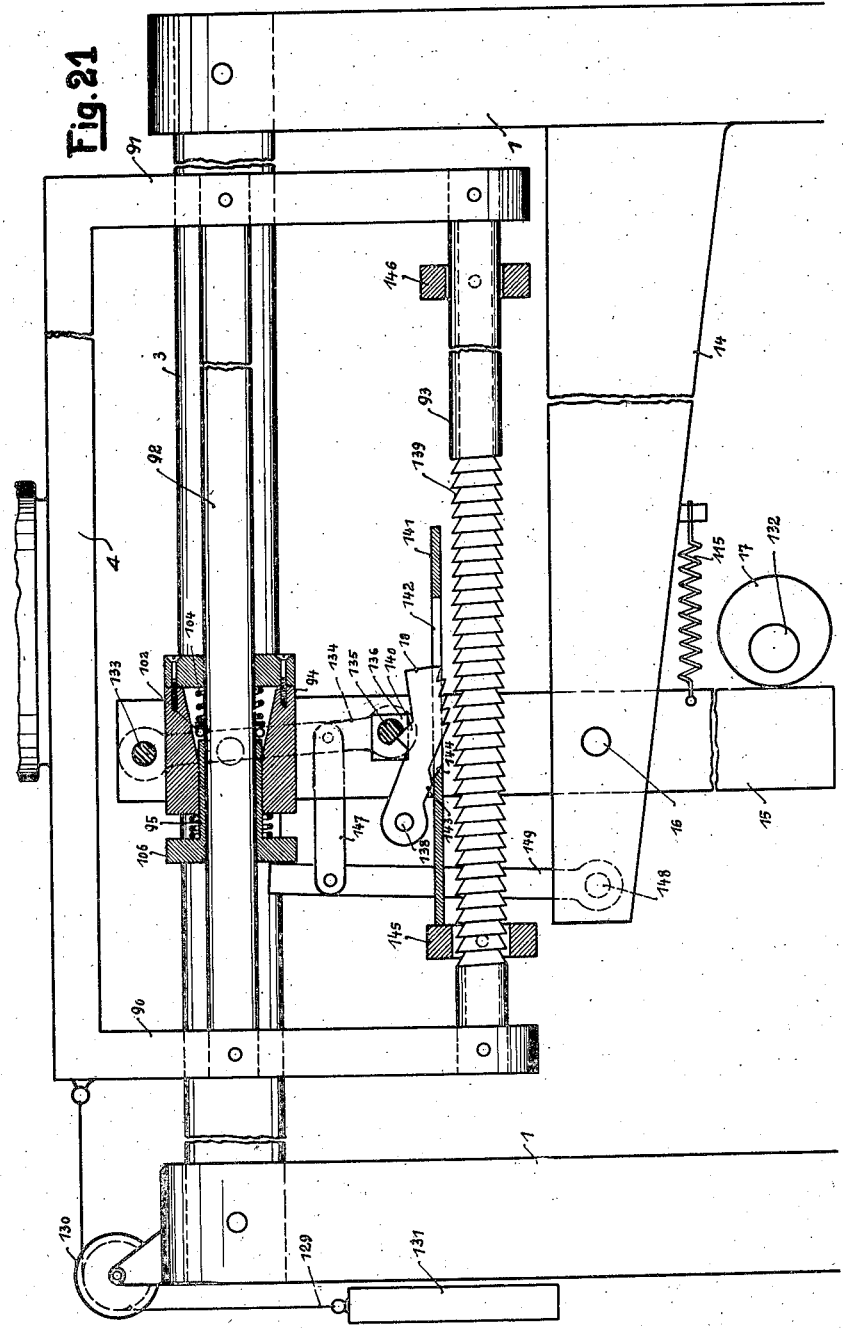

Sept. 8, 1936.                M. WINTERHALTER                2,053,544
        METHOD OF AND APPARATUS FOR SUPPLYING SLIDING
              CLASP FASTENER ELEMENTS TO STRINGERS
                    Filed March 28, 1932        26 Sheets-Sheet 12
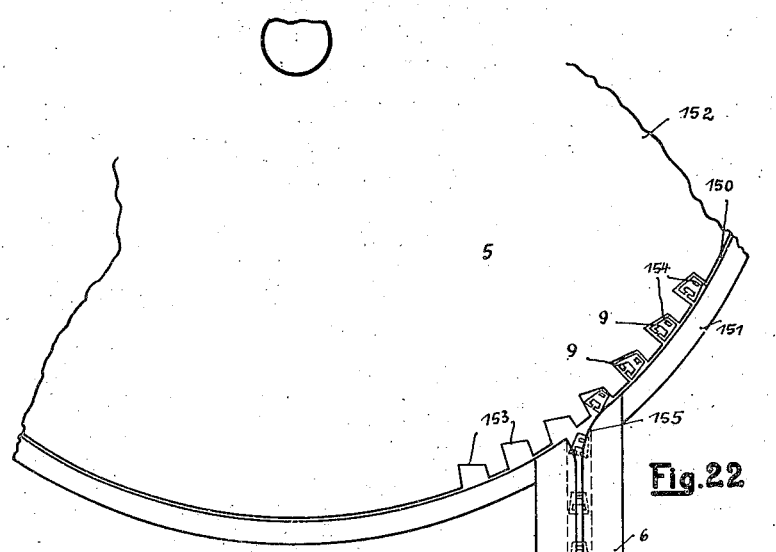
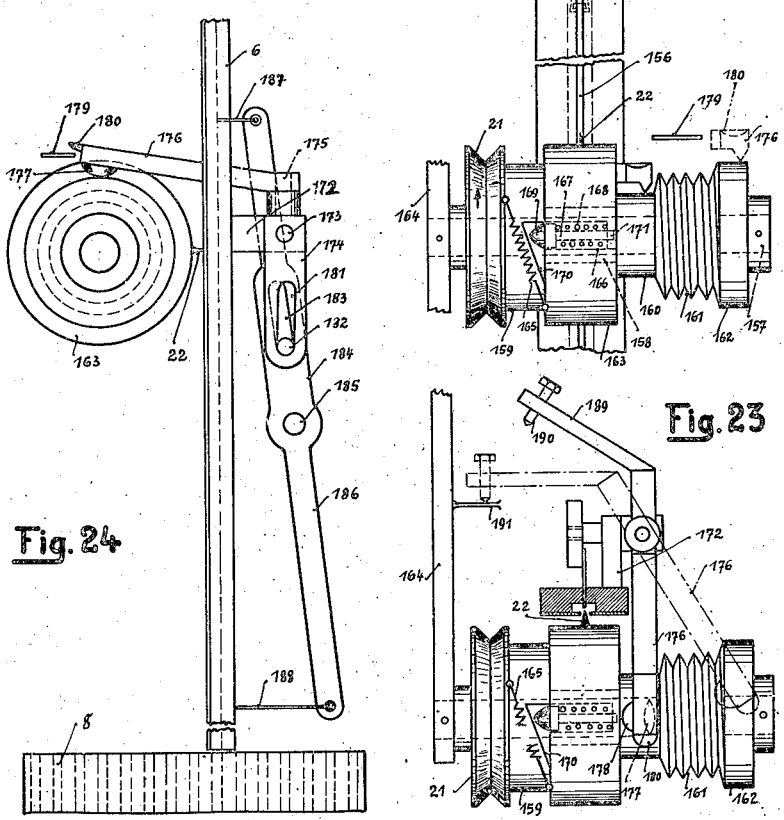

Sept. 8, 1936.  M. WINTERHALTER  2,053,544
METHOD OF AND APPARATUS FOR SUPPLYING SLIDING
CLASP FASTENER ELEMENTS TO STRINGERS
Filed March 28, 1932   26 Sheets-Sheet 13
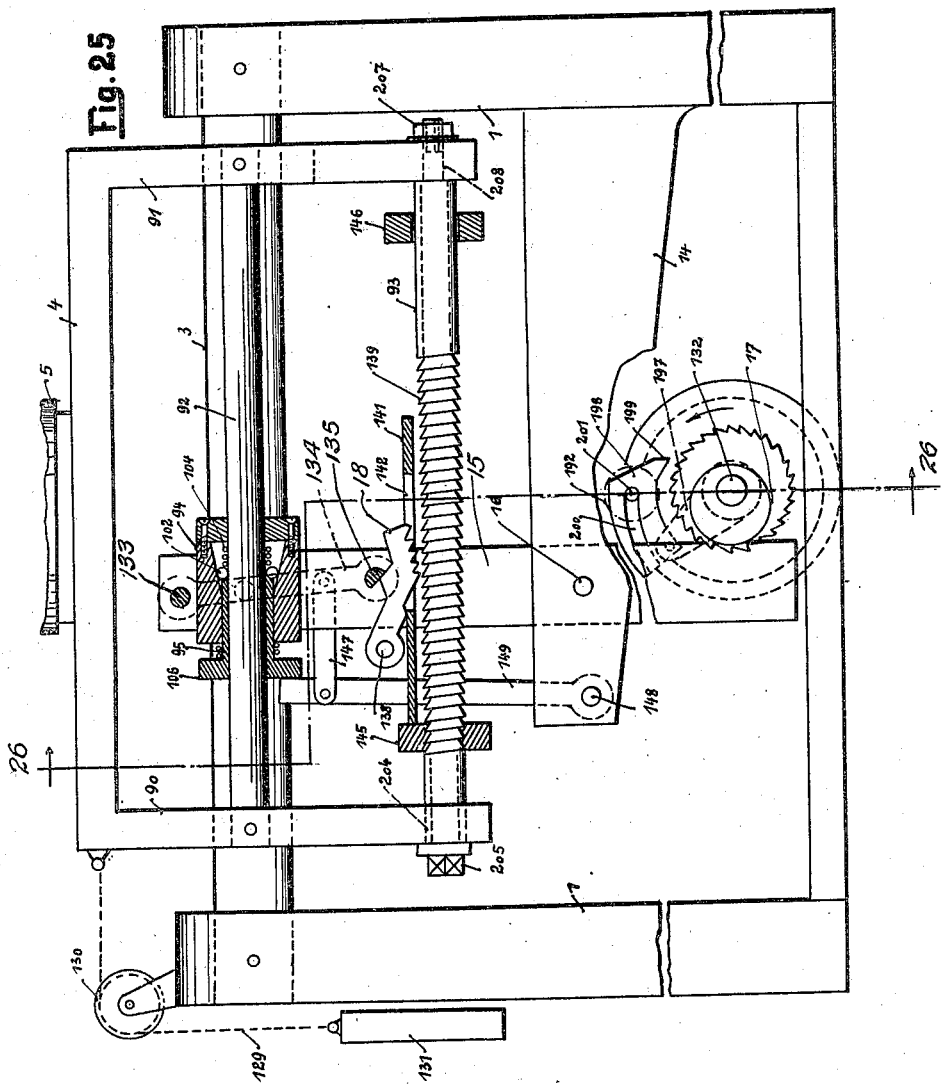

Sept. 8, 1936.   M. WINTERHALTER   2,053,544
METHOD OF AND APPARATUS FOR SUPPLYING SLIDING
CLASP FASTENER ELEMENTS TO STRINGERS
Filed March 28, 1932   26 Sheets-Sheet 15
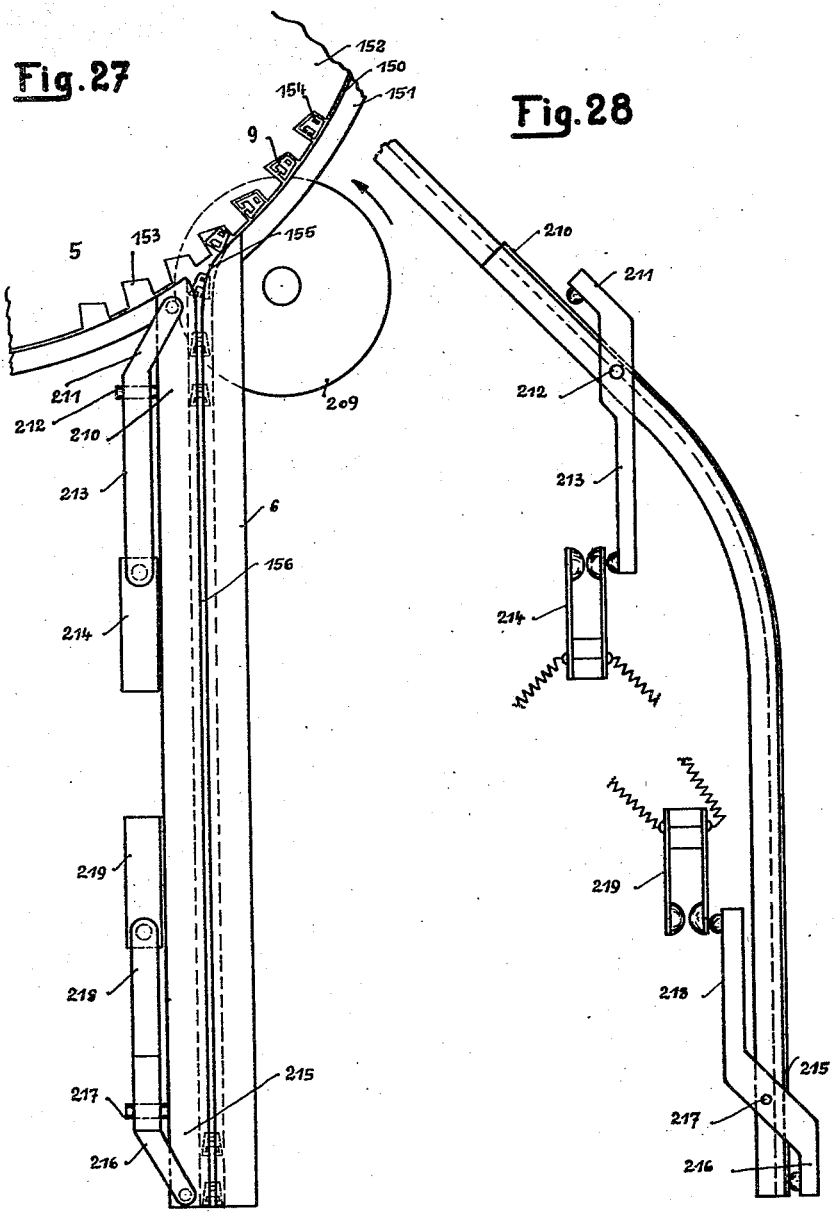

Sept. 8, 1936.    M. WINTERHALTER    2,053,544
METHOD OF AND APPARATUS FOR SUPPLYING SLIDING
CLASP FASTENER ELEMENTS TO STRINGERS
Filed March 28, 1932    26 Sheets-Sheet 16
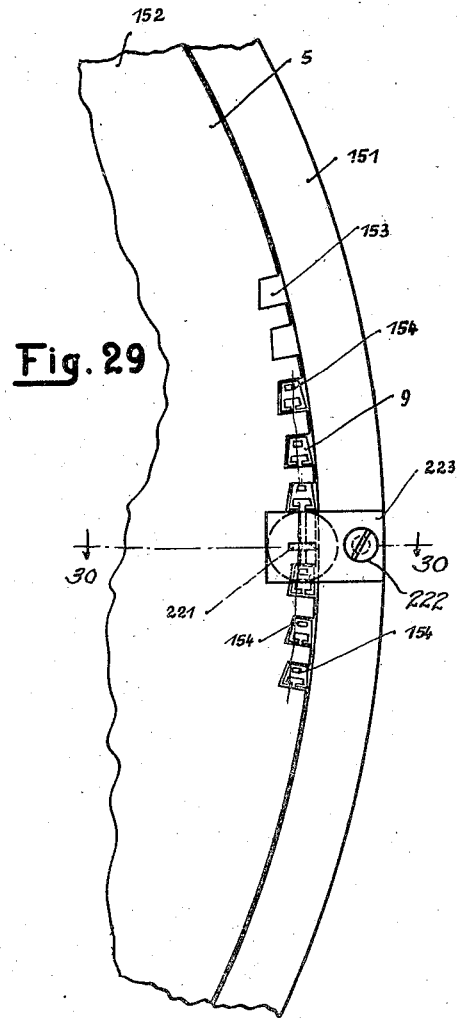
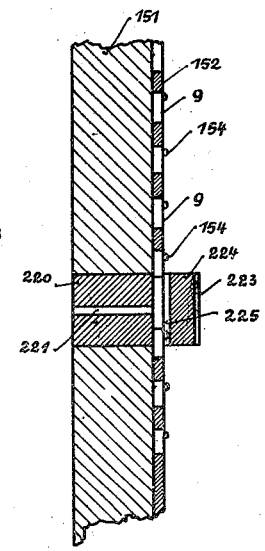
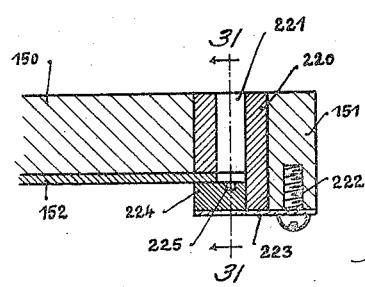

Sept. 8, 1936.  M. WINTERHALTER  2,053,544
METHOD OF AND APPARATUS FOR SUPPLYING SLIDING
CLASP FASTENER ELEMENTS TO STRINGERS
Filed March 28, 1932   26 Sheets-Sheet 17
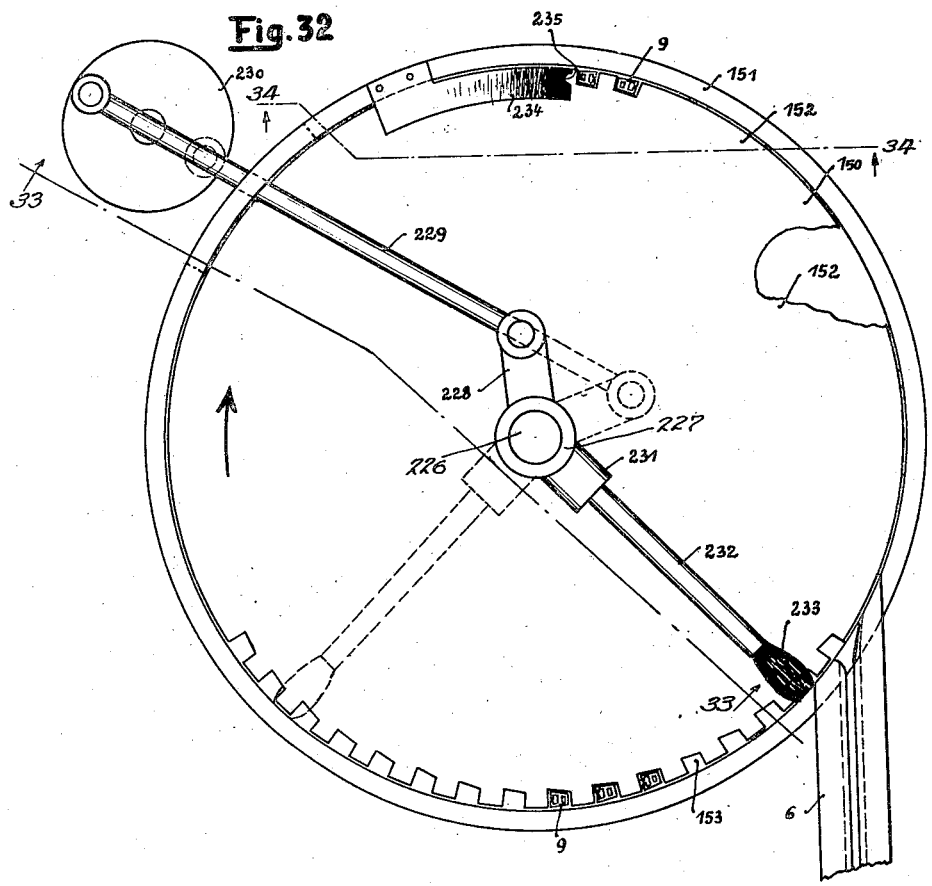
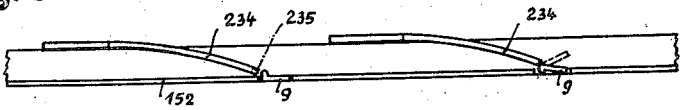

Sept. 8, 1936.  M. WINTERHALTER  2,053,544
METHOD OF AND APPARATUS FOR SUPPLYING SLIDING
CLASP FASTENER ELEMENTS TO STRINGERS
Filed March 28, 1932   26 Sheets-Sheet 18

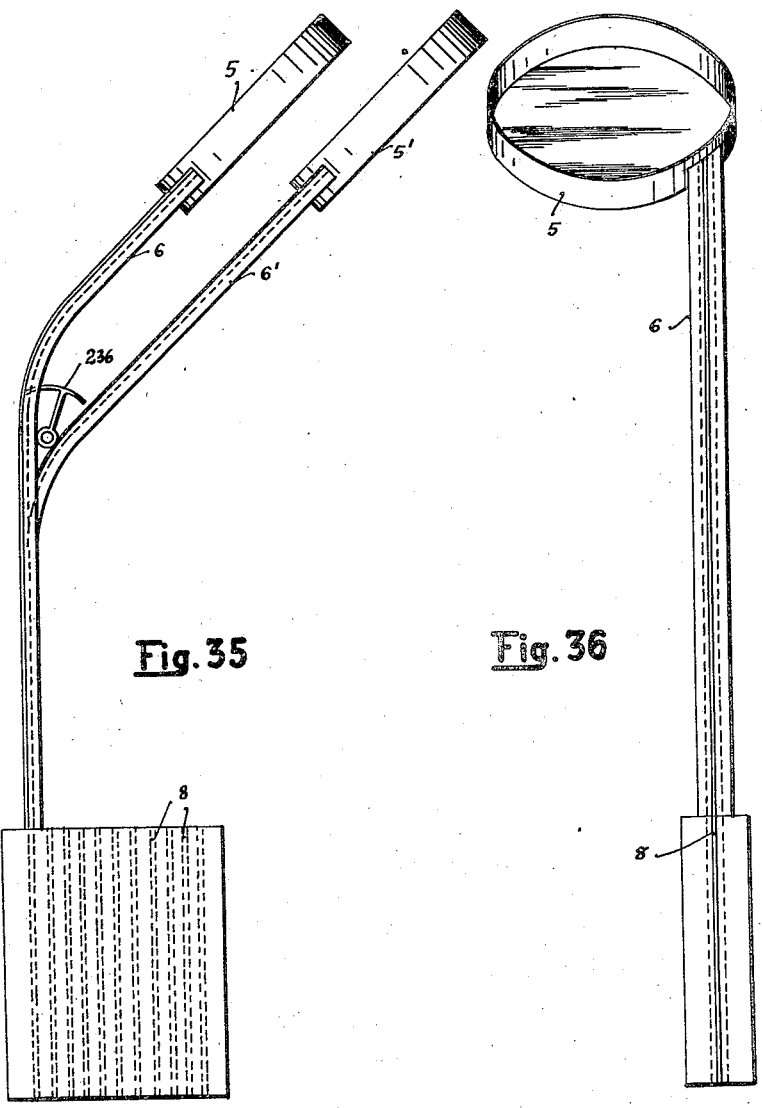

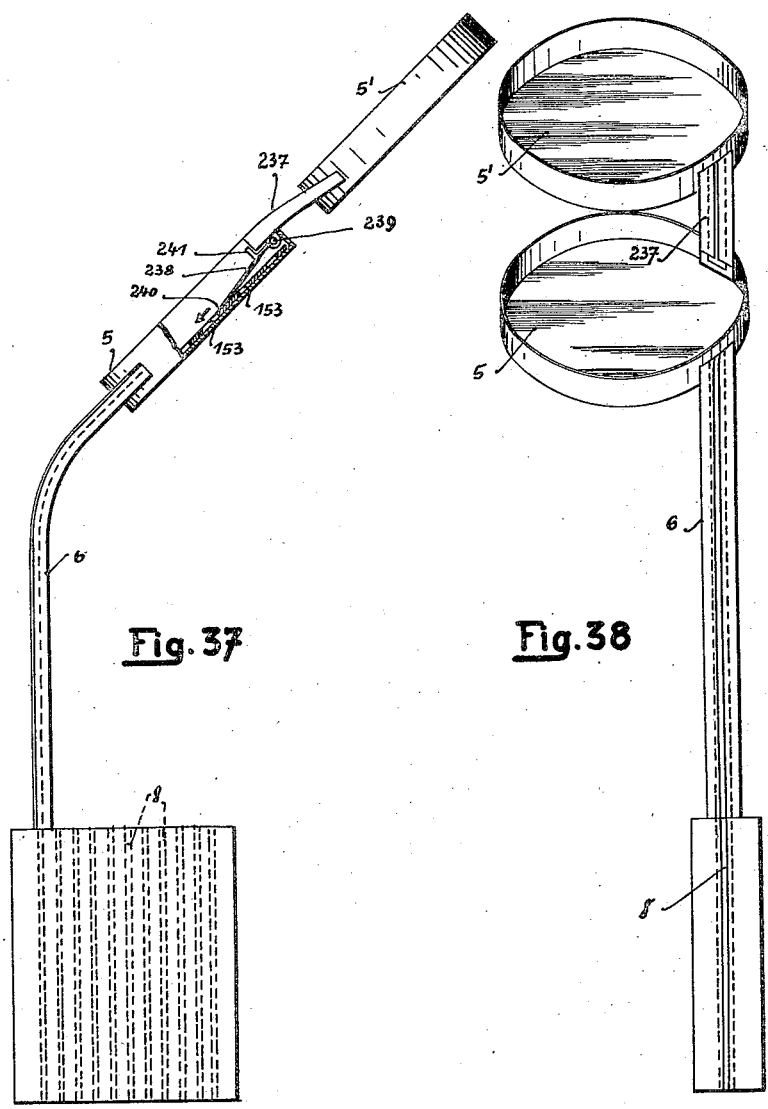

Sept. 8, 1936.    M. WINTERHALTER    2,053,544
METHOD OF AND APPARATUS FOR SUPPLYING SLIDING
CLASP FASTENER ELEMENTS TO STRINGERS
Filed March 28, 1932    26 Sheets-Sheet 21
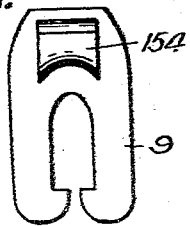
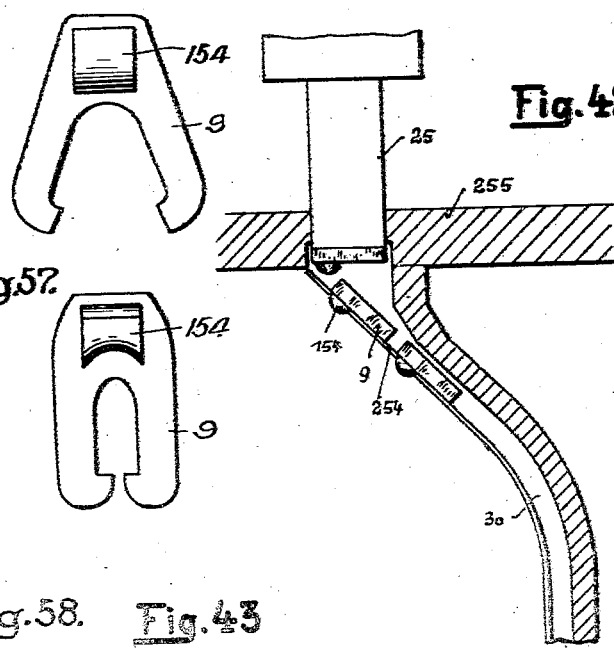
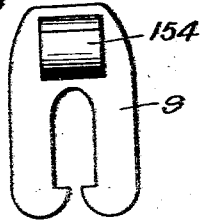
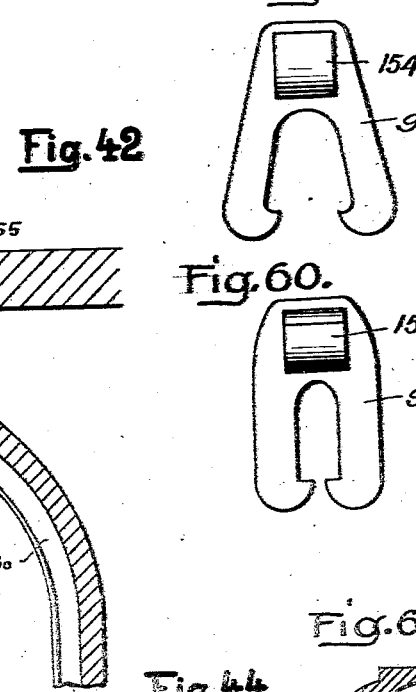
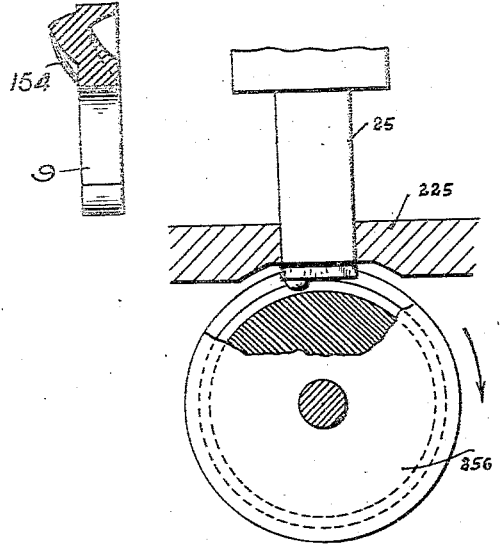
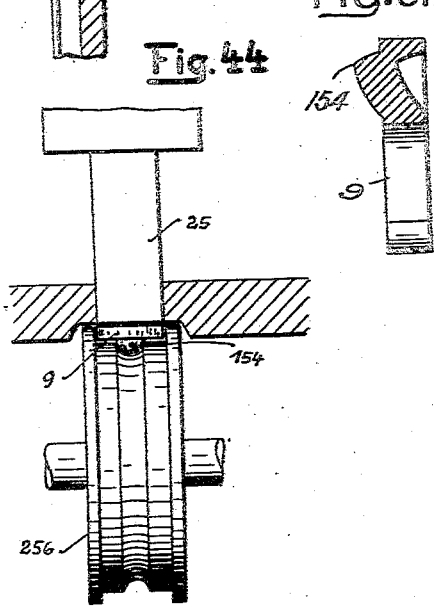

Sept. 8, 1936.  M. WINTERHALTER  2,053,544
METHOD OF AND APPARATUS FOR SUPPLYING SLIDING
CLASP FASTENER ELEMENTS TO STRINGERS
Filed March 28, 1932   26 Sheets-Sheet 22
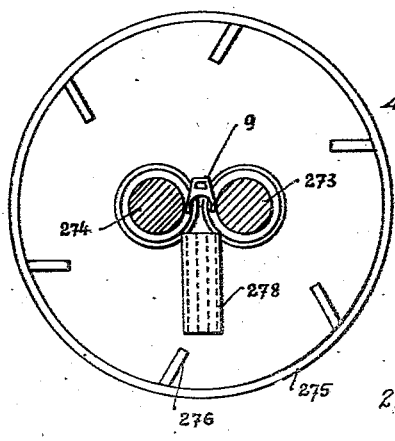
Fig.46
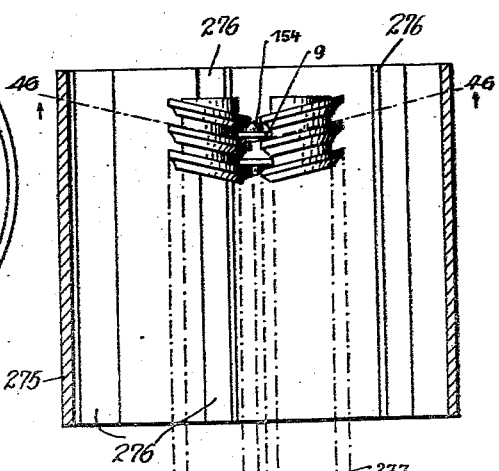
Fig.45
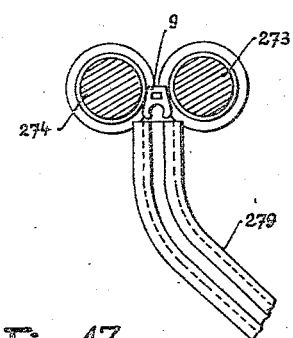
Fig.47
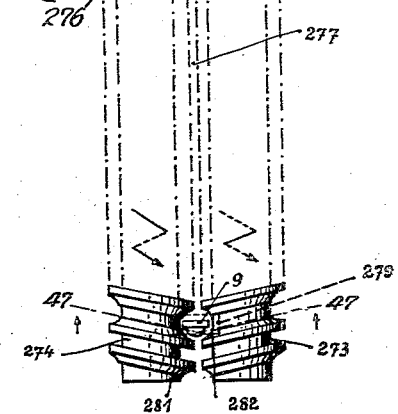

Sept. 8, 1936.  M. WINTERHALTER  2,053,544
METHOD OF AND APPARATUS FOR SUPPLYING SLIDING
CLASP FASTENER ELEMENTS TO STRINGERS
Filed March 28, 1932  26 Sheets-Sheet 23
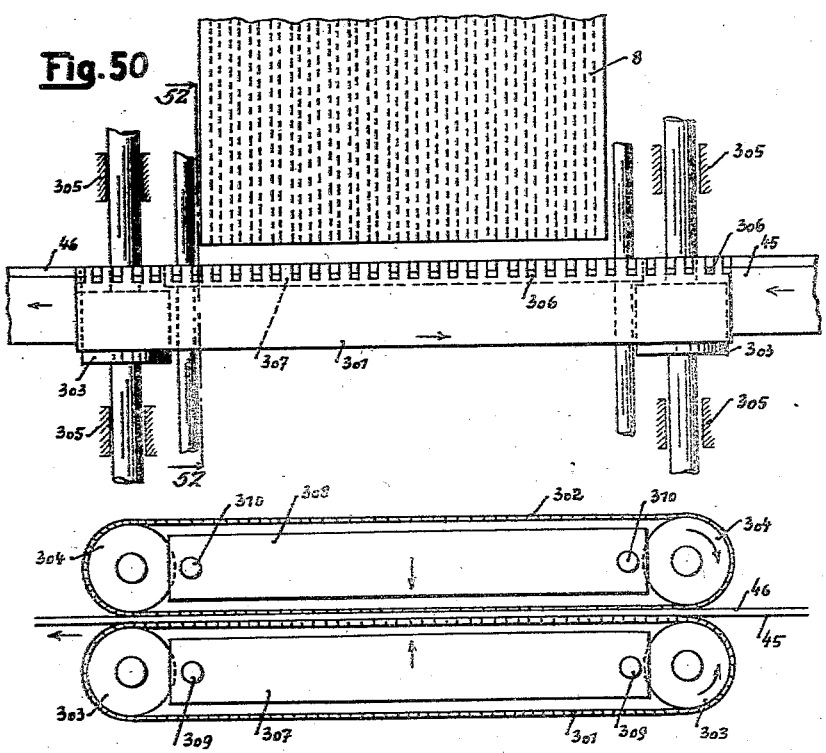
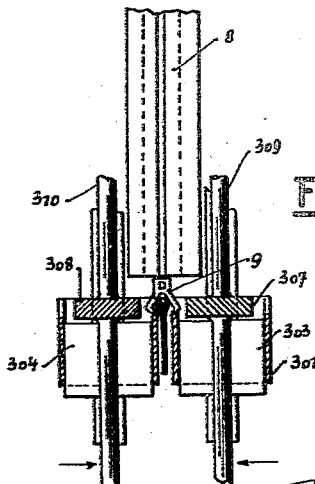

Sept. 8, 1936.   M. WINTERHALTER   2,053,544
METHOD OF AND APPARATUS FOR SUPPLYING SLIDING
CLASP FASTENER ELEMENTS TO STRINGERS
Filed March 28, 1932   26 Sheets-Sheet 24
Fig.53
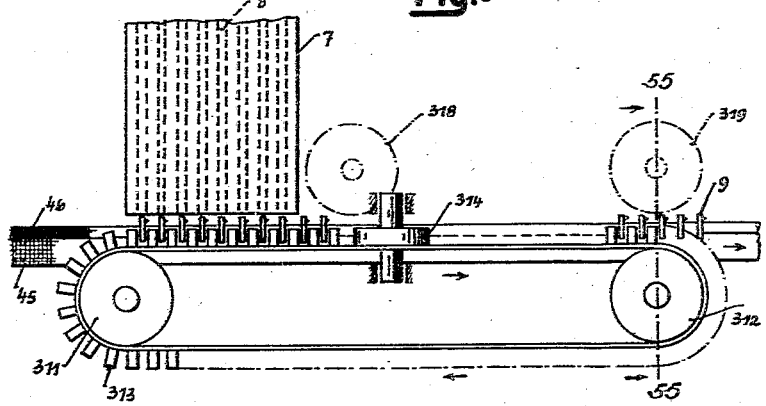
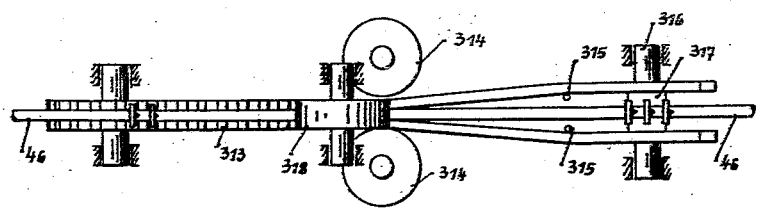
Fig.54
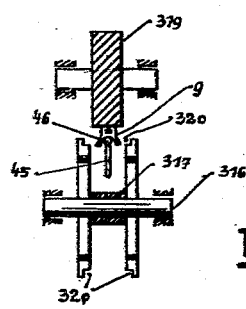
Fig.55

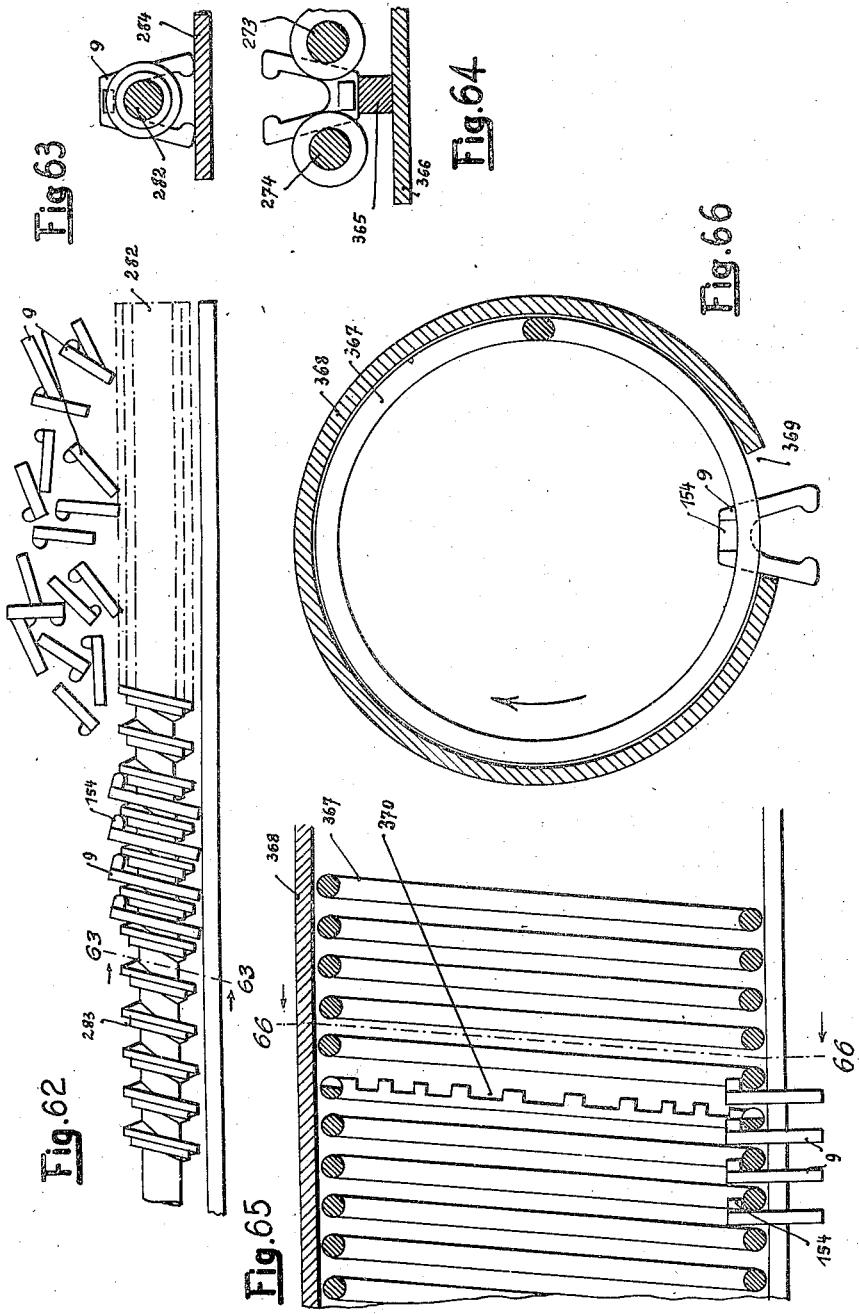

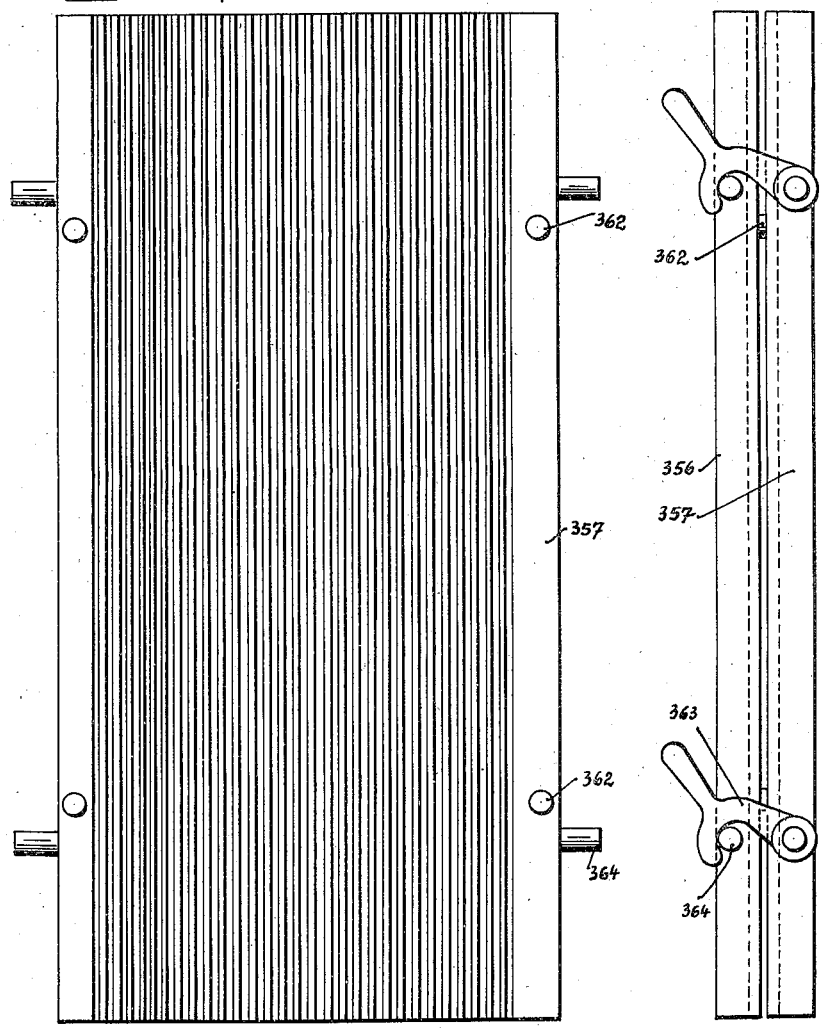
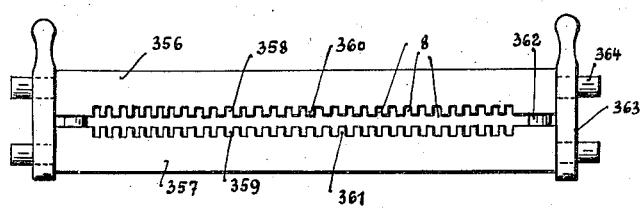

Patented Sept. 8, 1936

2,053,544

UNITED STATES PATENT OFFICE 2,053,544

METHOD OF AND APPARATUS FOR SUPPLYING SLIDING CLASP FASTENER ELEMENTS TO STRINGERS

Martin Winterhalter, St. Gallen, Switzerland

Application March 28, 1932, Serial No. 601,480
In Germany June 28, 1930

57 Claims. (Cl. 153—1)

This invention relates to methods of and apparatus for supplying the closing members or fastener elements which form part of sliding clasp fasteners to their stringer. More particularly, the apparatus forming part of my invention works entirely automatically.

My present invention consists of further improvements of the methods and apparatus described in my co-pending application for United States patent, Serial No. 402,778, filed Oct. 26, 1929 of which this application is in part a continuation.

In order to supply the closing members or fastener elements of sliding clasp fasteners to their stringers it had heretofore been usual either to make said closing members or fastener elements by a machine and to supply within the same machine the completed fastener elements individually to the stringer which ordinarily consists of a tape of fabric or the like, or to make the fastener elements separately and to supply the same with the aid of comb-shaped templates to the stringer as a separate working step. The templates in the latter case serve to maintain proper distances between the fastener elements on their stringer and eventually also to support the latter. With this procedure the closing members or fastener elements have heretofore been individually inserted usually by hand into the gaps of the comb-shaped template.

This operation can only be carried out intermittently which requires a large amount of time also if a mechanical supply means is used, because for each fastener element the following operations have to be carried out in succession: First, opening of a supply channel, second, dropping the fastener element, third, setting the fastener element onto the stringer, fourth, closing up the aforementioned channel, fifth, feeding said channel forward towards the next gap of the template and sixth, again opening said channel.

The working capacity of an apparatus which operates according to this principle will consequently only be relatively small. About the same working capacity may be attained, when employing the process mentioned herein further above, in which process the fastener elements are made and supplied to their carrier in one and the same machine.

My present invention now has for its object primarily to further improve the aforementioned method and apparatus with a view of dispensing as much as possible with any kind of manual labor and of supplying a maximum amount of fastener elements to their stringer in a given time. According to my present invention this is attained by completely doing away with the aforementioned intermittent working, and by having an interruption only whenever a definite length of the stringer—which length may be adjusted at will within wide limits—is completely equipped with fastener elements. According to my invention, more particularly, this is accomplished by keeping the fastener elements in position ready for being taken out of a supply container or magazine in a manner permitting correlated feed of said fastener elements from said supply container or magazine to the stringer. By the term "correlated feed" I desire to imply a mode of group feeding said fastener elements, whereby the latter are being taken out of the supply container or magazine simultaneously in series or in rapid succession for the purpose of supplying the same to the stringer. Keeping the fastener elements in position ready for being supplied to the stringer in the aforementioned manner is effected by the aid of an intermediary device which accumulates groups of properly spaced fastener elements so that the stored up fastener elements may be supplied simultaneously or in rapid succession to the template. As this storing up of the fastener elements is accomplished without interruption, according to my invention continuity of operation is only interrupted, whenever a piece of stringer after being equipped with fastener elements is taken out and replaced by a subsequent piece of stringer.

As far as the specific construction of the aforementioned intermediary device is concerned, there is a great variety of possibilities, for the reason alone that the fastener elements as above mentioned are simultaneously kept in position either in series or in rapid succession to each other. The intermediary device therefore will form in general a storage container in which the fastener elements are kept piled up in the form of a stack. This piling up of the fastener elements may be carried out either in perpendicular direction having the fastener elements positioned one on top of the other or also in horizontal direction having the fastener elements arranged side by side. In case the fastener elements are piled up, both, in vertical and horizontal direction, the aforementioned intermediary device or storage container which forms part of my invention is subdivided into two parts, the fastener elements being piled up in vertical direction in one part of said container and arranged side by side in the other part of said container at the necessary distance from each other. The two storage containers which are used in this case are preferably mounted movably with respect to each other.

The storage container or containers now, as the case may be, may either be supplied with completely shaped fastener elements by means of a distributor or a plurality of distributors. Supply of fastener elements to the storage container or containers, however, may also be accomplished by having the implement or tool by which the fastener elements are made inserted in front of the storage container. This implement or tool may, for instance, consist of a stamping or punching device. A device of this kind serves to make simultaneously a greater number of fastener elements so that sufficient supply of fastener elements will be assured. At the same time care should be taken that feeding of the fastener elements in the storage container in which they are positioned horizontally side by side is performed in accordance with the process of making said elements. If, for instance, five fastener elements are made at a time by a single operation of stamping or punching and subsequently supplied to the storage container, the latter would have to be moved forward at any time a distance which corresponds to five fastener elements including the distances therebetween.

The storage containers for the fastener elements are preferably arranged adjacent each other, this arrangement being preferable from a mechanical point of view. The under container moreover may be composed according to my invention of a plurality of collecting containers or chutes which are arranged vertically side by side at distances from each other which are in agreement with the distances between the several fastener elements, while the upper storage container may consist either of a single supply conduit or also of a plurality of such conduits. In the former case it is supposed that the supply conduit is united with a distributor, while the latter arrangement will especially be suitable, if the implement or tool which serves for making the fastener elements is inserted immediately in front of the upper storage container.

In the accompanying drawings I have represented some preferred constructions of my present automatic machine which supplies the fastener elements to the stringer to form sliding clasp fasteners. Fig. 1 is a general view in elevation of one form of machine constructed according to my invention, Fig. 2 a similar view of another form of construction of my present machine, Fig. 3 a view of a blank of sheet metal from which fastener elements have been stamped out by means of a stamping or punching device forming part of Fig. 2, Fig. 4 an elevation of the mechanism for conveying fastener elements to the stringer, Fig. 5 a bottom view taken on Fig. 4, Fig. 6 a side-view, partly in cross-section, on Fig. 4, Figs. 7, 8 and 9 transverse sections through the under part of the collecting chutes of Fig. 5 with the parts in proximity thereto shown in three different positions of Fig. 5, Fig. 10 an enlarged sectional view of comb-shaped members forming part of Figs. 7, 8 and 9 and Figs. 11 and 12 views partly in section and partly in elevation of two detail members which form part of the machine. Figs. 13 and 14 are plan views showing some details of Fig. 4 relating to a construction of collecting channels and of the means for conveying the fastener elements from these channels to the stringer, Fig. 15 is an elevation of a part of Fig. 1, this part relating to the automatic supply of fastener elements to collecting chutes, Fig. 16 a side view, partly in section, taken on line 16—16 of Fig. 15, Fig. 17 a longitudinal detail section showing part of the supply mechanism of Fig. 15, Fig. 18 a further longitudinal section through another part of said supply mechanism, Fig. 19 a front view showing a part of Figs. 17 and 18, Figs. 20 and 21 are elevations, partly in section, showing a modified stop mechanism in two different positions, Fig. 22 an elevation showing the construction of a storage container for the fastener elements, said container including a rotary member, Fig. 23 a plan view of Fig. 22, it being assumed that said rotary member has been rotated through an angle of 90°, as compared with Fig. 22, Fig. 24 a side view on Fig. 23, Fig. 25 an elevation, partly in section, showing a special bearing forming part of the construction of machine shown in Fig. 1, Fig. 26 a view, mostly in section on the line 26—26 of Fig. 25 but with the bracket 14, cam 17, links 15 and pin 135 shown in full irrespective of the section, Fig. 27 an elevation of a modified construction of the supply container forming part of Fig. 1, Fig. 28 a side view on Fig. 27, Fig. 29 a plan view of a device serving for proper surface treatment of the fastener elements, Fig. 30 a cross-section taken along line 30—30 of Fig. 29, Fig. 31 a longitudinal section taken along line 31—31 of Fig. 30, Fig. 32 a plan view showing a further device which serves for surface treatment of the fastener elements, said device being used in connection with the machine shown in Fig. 2, Fig. 33 a sectional view taken substantially on the line 33—33 of Fig. 32, Fig. 34 a section along line 34—34 of Fig. 32, as seen in direction of the arrows, this figure however showing two springs 234 instead of the one appearing in Fig. 32, Fig. 35 an elevation of a modified construction of the distributor including the supply channels for the fastener elements, Fig. 36 a side view on Fig. 35, Fig. 37 an elevation of a further modified construction of the distributor and supply channels, Fig. 38 a side view on Fig. 37, Fig. 39 a fragmentary portion, in section, of a supply channel 30 of Fig. 2 showing attachments for treating the fastener elements as they pass through the channel 30, Fig. 40 a transverse section through Fig. 39 in direction of line 40—40, Fig. 41 a view of a supply channel of this kind including further details of constructions, Fig. 42 a longitudinal section through a supply channel of this kind at the front part thereof, Fig. 43 a detail front view, partly in section, of a supply mechanism for the fastener elements after coming out of the punching device forming part of Fig. 2, Fig. 44 a side view taken on Fig. 43, Fig. 45 a top view, partly in section, of a special supply mechanism of the form of a mixing drum with two spindles supplying fastener elements to the stringer, Fig. 46 a transverse section taken along line 46—46 of Fig. 45, Fig. 47 a further transverse section taken along line 47—47 of Fig. 45, Fig. 48 a top view of a modified construction of mixing drum with a single spindle for supplying fastener elements to the stringer, Fig. 49 a cross-section taken through Fig. 48, Fig. 50 an elevation of a device which serves for carrying the stringer through the machines shown in Figs. 1 and 2, Fig. 51 a plan view on Fig. 50, Fig. 52 a transverse section on line 52—52 of Fig. 50, Fig. 53 an elevation of a device of the last-mentioned kind consisting of an endless band, Fig. 54 a plan view on Fig. 53, Fig. 55 a transverse section along line 55—55 of Fig. 53, as seen in direction of the arrows, Figs. 56 to 61 an elevation and central longitudinal section through an individual fastener element in two forms of construction, Fig. 62 a longitudinal view of a threaded spindle serving to properly distribute the fastener elements when being supplied to the stringer, Fig. 63 a transverse section along line 63—63 of Fig. 62, Fig. 64 a transverse section through a distributing device of the kind shown in Fig. 62 having two spindles positioned parallel to each other and rotating in opposite direction, Fig. 65 a longitudinal section, through a template which consists essentially of a helical spring which may be rotated within a tube, Fig. 66 a transverse section along line 66—66 of Fig. 65, Fig. 67 an interior view of a special two-part construction of storage container for the fastener elements, Fig. 68 a top view of said storage container showing the two parts thereof united with each other and Fig. 69 a side view of Fig. 67 showing likewise the two parts of the container united with each other.

The machine shown in Fig. 1 is supported by uprights or standards 1 which at their upper part are equipped with proper lateral extensions or supports for the several parts of the machine. The two members thus formed are connected with each other by transverse rods 2 and 3, the latter forming simultaneously a guide for a frame 4 which supports the displaceable parts of the machine. The displaceable parts of the machine consist of a distributor 5 and a supply channel 6 which is fixedly connected to said distributor, said supply channel permitting the fastener elements to slide downward after coming out of said distributor. The supply channel 6 which acts as an upper storage container in the sense of my invention leads to the other storage container or under container 7 which is fixedly mounted and provided with several vertically directed channels or chutes 8 in which the fastener elements are piled up in vertical direction one on top of the other.

The tape or fabric or stringer to which the fastener elements 9 are supplied is kept within a template 10 which may be moved in upward and downward direction by means of the eccentrics 12 and the hand lever 11 connected therewith to fix the fastener elements coming out of the chutes 8 by pressure to the stringer which forms part of a sliding clasp fastener. Release of the fastener elements is effected by a hand lever 13 which may be swung in horizontal direction. This hand lever as well as the several other parts shown in Fig. 1 are described hereinbelow with particular reference to the detail figures in co-operation with further operating parts of the machine.

On the right-hand standard 1 of the machine there is further mounted a bracket 14, a swinging lever 15 being fulcrumed to said bracket as shown at 16. The lever 15 may be swung by means of an eccentric 17 to move the frame 4 forward from one to the other of the chutes 8 during each swinging motion of said lever. The feeding motion of the frame 4 is described more fully hereinbelow. The amount of feeding motion is determined by a pawl 18 which co-operates with a threaded spindle 93. After the frame 4 has passed through the entire range of feeding motion the pawl 18 is released and said frame may now return into its initial position.

Rotation of the eccentric 17 is effected by an electric contact the closing of which depends on the degree of filling the supply channel 6. Closing the electric contact further actuates a locking device 20 which in one position thereof causes a certain number of fastener elements which are piled up in the supply channel 6 to pass into one of the collecting chutes 8, while in the other position said locking device 20 causes a subsequent series of fastener elements to collect within the channel 6. Operation of the aforementioned electric contact is controlled by a rotating disk 21 and a finger 22 connected thereto, said finger being arranged to enter the supply channel 6 in the manner described hereinbelow. The disk 21 is driven by a further disk 23 which is rotated from the outside and serves simultaneously for driving the movable parts within the distributor 5.

According to Fig. 2 the machine is provided similarly to Fig. 1, at its under part with vertical chutes 8 which as a whole constitute the storage container 7. Underneath the chutes 8 or storage container 7 there is again provided a template 10 for reception of the stringer which is of the form of a tape of fabric as well as for reception of the fastener elements 9 on said stringer. The storage container 7 and the template 10 are supposed in the present case to be mounted movably in longitudinal direction.

A distinctive feature of the construction of my present machine according to Fig. 2 consists therein that there is no distributor as is the case in the construction according to Fig. 1. In the construction shown in Fig. 2 it is supposed that the fastener elements after being made are immediately supplied to the stringer through the chutes 8 which form the storage container 7. In this case the devices which serve for making the fastener elements are united with the storage containers. Accordingly, the punches or dies 25 which serve for making the fastener elements are arranged at the upper part of the frame 24 of the machine, five such dies being shown in Fig. 2. These dies are moved up and down in known manner, a blank of sheet metal 26 being inserted underneath said dies permitting upon downward motion of the latter to stamp simultaneous'y five fastener elements out of the blank. A blank of this kind is shown in detail in Fig. 3.

As shown in Fig. 3 the blank 26 of sheet metal is provided on either edge thereof with a series of perforations 27 which serve for feeding said blank forward underneath the dies 25. At first the elevated or recessed parts 28 which act as the locking members proper of the fastener are stamped out of the blank 26 by means of a series of dies and thereupon the fastener elements 9 are stamped out as a whole by a second working step which is immediately subsequent to the first mentioned stamping. In this manner parts 29 will be stamped out of the blank, five such parts being simultaneously obtained with the machine shown in Fig. 2. The fastener elements 9 after being stamped out of the blank 26 are immediately carried into five channels 30 shown in Fig. 2 of which each is of a conformation similar to that of the supply channel 6 shown in Fig. 1. Within the channels 30 there may further be provided special organs for working the fastener elements as more fully described further below.

The five channels 30 lead immediately into the chutes 8 which constitute the storage container 7 and are placed at distances from each other in agreement with the distances between five adjacent chutes 8 of the storage container 7.

As the channels 30 in the present case are assumed to be fixed in position, the storage container 7 must be mounted displaceably with respect to said channels 30 as had above been mentioned so that when a sufficient quantity of fastener elements have been deposited in the group of chutes 8 with which the channels 30 communicate, the container 7 may be moved to place another group of chutes 8 in communication with the channels 30.

In order to guide the container 7 and the template 10 in proper direction I provide guide rails 31 and 32 which are pivoted to the frame of the machine as shown at 33 and 34 in a manner to permit the container 7 as well as the template 10 to be taken out of the machine.

The template 10 as had above been mentioned in connection with Fig. 1 may be moved up and down by means of a hand lever 11 and eccentrics 12 shown in Figs. 1 and 2. The eccentrics 12 are so arranged and distributed that the template 10 will at any time be under control of at least two eccentrics.

The mode of operation of the machine shown in Fig. 2 may be carried out in different ways depending upon the velocities of motion of the several parts and in particular the velocity of operation of the stamping device. Thus, for instance, the parts stamped out of the blank of sheet metal may immediately be supplied to the template 10 and therewith to the stringer therein, the template in this case being moved forward every time a distance which is equal to the distance along which fastener elements are at a time mounted on the stringer. However, it will also be possible according to Fig. 1 to supply fastener elements which are piled up in vertical direction through the channels 30 to the storage container 7, and in this case the latter would have to be properly moved forward underneath said channels. Motion of the template in the present case would likewise have to be dependent upon the motion of the container 7.

Figs. 4 to 14 relate to an individual part of the machine shown in Fig. 1 viz: to a construction of the aforementioned storage container 7 and the means for conveying the fastener elements from the channels or chutes 8 of the storage container 7 to the stringer which is located within the template 10.

Figs. 4 and 5 show solely one half of the aforementioned device, the other half being symmetrical thereto. The particular description given herein for one of these halves accordingly holds also true for the other half.

35 are two vertically positioned pillars which serve for the reception of the collecting channels or chutes 8 therebetween, said collecting channels or chutes being formed by metal sheets 37 and 38 of alternately greater and smaller thickness placed adjacent to each other. These channels or chutes serve for the reception of a stack of fastener elements 9 with downwardly directed jaws as may be seen from Figs. 7, 8 and 9. The metal sheets 37 of greater thickness are spaced from each other as shown in Fig. 5 only at a small distance at their front sides, while the metal sheets 38 of smaller thickness are positioned more rearwardly to form the chutes 8. The chutes 8 may of course also be made from a single piece of sheet metal.

The chutes 8 may be closed up at their under ends by movable pins 39 which enter the chutes in lateral direction. For this purpose the metal sheets 38 as shown in Figs. 7, 8 and 9 are cut out at a place above the locking pins 39. The latter are fixed each upon a rail 40, these rails being moved relatively to each other in order to close and open the chutes 8. The rails 40 now are mounted upon a further pair of rails 41 of the shape of a ruler as shown in the drawings. The latter pair of rails 41 may be moved together with the former pair of rails 40.

As Fig. 4 shows, a guide latch 42 is fastened to each pillar 35 underneath the chutes 8 and members 43 are slidably mounted on said guide latch to serve for the reception of the comb-shaped members 44 shown in Figs. 7 to 10 said members 43 and 44 together constituting the template which is indicated at 10 in Fig. 1. These comb-shaped members 44 support the stringer 45 formed in the usual manner of tape of fabric having a re-inforced or corded upper edge. The comb-shaped members 44 are further provided in known manner with gaps 47 into which the fastener elements 9 may enter. At this place the fastener elements 9 are fixed on the stringer with their jaws in known manner, by pressing said jaws together around the re-inforced or corded edge of the stringer.

The rails 40 carry the pins 48 (Fig. 5) which extend into proper openings of the rails 41, said pins acting as coupling members for the two rails in horizontal direction. The rails 40 are mounted on the pillars 35 with the aid of blocks 49 fast on said pillars and are further provided with guide-slots 50 having angular members 51 mounted displaceably therein, said rails 40 being fastened to the outer arms 52 of said angular members 51 by means of screws 53.

Springs 54 and 55 serve to support the rails 40 and 41 in proper position relatively to each other, said springs 54 and 55 engaging the outer ends of the rails 40 and 41 and tending to move said rails in direction towards each other. In order to properly guide the rails 40 and 41 with respect to each other a pin 56 is provided on either outer end of one of said rails, said pin being displaceable within a sleeve 57 of proper conformation mounted on the other rail.

On the outside of each pillar 35 there are provided, as shown in Fig. 6, two bearing blocks 58 and 59 which are positioned one above the other and a spindle 60 is mounted rotatably and longitudinally displaceably in said bearing blocks. A spring 61 acts with one of its ends on the bearing block 58 and with the other end against a collar 62 fast on the spindle 60 tending to keep said spindle always in the uppermost position as shown. At its upper end the spindle carries a fork 63 fixedly connected therewith to participate in the rotation as well as in the longitudinal displacement of said spindle. The fork 63 forms a bearing for the rod 64 which is provided at one end thereof with a flattened portion 65 extending into a slot 66 in the handle 13 to be horizontally rotatable therein. By horizontally displacing the handle 13, as indicated by the arrow in Fig. 5, the rod 64 will be laterally displaced. At the other end the rod 64 is provided with slots 68 and 68a arranged crosswise permitting on the one hand a pin 69 to slide in the slot 68 and a flattened part of a shaft 71 to slide in the second slot 68a positioned perpendicularly to the slot 68. The shaft 71 accordingly is positioned opposite the handle 13 and participates in opposite sense in the motions of the latter. The shaft 71 is mounted rotatably and displaceably in longitudinal direction in brackets 72, as shown in Fig. 5, said brackets terminating into bearing eyes 73 and being fastened to the pillars 35. The shaft 71 will thus form the pivot for the rotation of the rod 64 which acts as a single-armed lever. In order to limit horizontal displacement of the shaft 71, the latter is provided with collars 74 fast thereon. During horizontal displacement of the handle 13 the spindle 60 serves as a pivot for the rod 64 and during vertical motion of the handle 13 the shaft 71 serves as a pivot for said rod 64.

At the under end of the spindles 60 there is mounted fast on either spindle a control member 75 which carries at its under end a part provided with flanges 76. The rails 41 move intermediate the flanges 76, said rails being forced to participate in the axial displacement of the spindle 60. The rails 40, however, will not participate in this axial displacement, because during such displacement the upper part of the control member 75 is displaced in vertical direction with respect to the shanks 52. The shanks 52, the same as the rails 41, are connected with the control member 75 by action of the springs 54 and 55 to move positively with said control member. Upon rotation of the spindles 60, therefore, the rails 40 and 41 will be moved away from each other, as soon as the control member 75 is moved into the position shown in Fig. 5. If, however, the handle 13 is moved in the direction shown in Fig. 5 by the arrow, the control member 75 will come into oblique position, thus moving the rails 40 and 41 in direction towards each other by action of the springs 54 and 55.

According to Fig. 10 which shows in an enlarged scale the comb-shaped members 44 together with the members 43 in transverse section, the stringer 45 consists, for instance, of a tape of fabric having a re-inforced or corded upper edge. In Fig. 10, moreover, the one comb-shaped member is cut away at the upper left-hand end so that a gap 47 is visible in the drawings.

Figs. 7, 8 and 9, 11 and 12 show two different possibilities of the mode of operation of my new machine and particularly of the mode of mounting the fastener elements onto the stringer 45. In Figs. 7 to 9 it is assumed, in accordance with the example of construction shown in Figs. 4 to 6 and Figs. 13 to 14, that two pairs of rails 40 and 41 form part of the machine. The rails 41 as represented in these figures can only move in horizontal direction. The particular performance of either construction of the machine will be as follows: At first the stringers 45 are inserted into the fastener elements and the comb-shaped members 43 and the latter are thereupon compressed. Thereupon the comb-shaped member is inserted and by actuation of a rod 77 (Fig. 4) the comb-shaped member together with the stringer is lifted to such an extent that it will assume the position shown in Figs. 7 to 9. Now the rails 40 and 41 are shifted outwardly to assume the position shown in Fig. 7 so that the undermost fastener elements 9 may descend within each chute 8 to straddle on the bead or corded edge 46 of the stringer 45 as may be seen from Fig. 7. The head of the fastener elements 9 in this case will still be positioned within the under end of the chute 8. If now the rails 40 and 41 are again moved back into their initial position, the inner oblique portions or surfaces 78 of the rails 41 will be pressed against the jaws of the fastener elements 9 and simultaneously therewith the locking pins 39 will again enter the chute 8. All operating parts of the machine will now come into the position shown in Fig. 8.

If now the two rails 41 are moved downward by rocking the hand lever 13 in downward direction, the fastener element 9 is pressed onto the bead or corded edge 46 of the stringer and the operating parts will now assume the position shown in Fig. 9. The fastener element now overlying the edge 46 of the stringer will thus be prevented against further descending by the locking pins 39. The rails 41 may again be moved upward, while the fastener elements will be properly kept in position on the stringer 45. The latter may now be taken out of the machine together with the jaws and comb-shaped members 44 by lowering the rod 77.

In the devices shown in Figs. 11 and 12 the stringer 45, the same as in Figs. 7 to 9, is supposed to be supplied with fastener elements which are composed of jaws and comb-shaped members. The several parts will first assume the position shown in Fig. 11. Upon outward motion of the rails 41 the undermost fastener element 9 will be released and consequently dropped onto the stringer 45 to assume the position shown in Fig. 12 with its top part yet positioned within the chute 8. The rails 41 will again move inwardly to contact with the jaws of the fastener element 9. The fastener element therefore will be kept in position by the rails 41 after the stringer 45 has been moved sufficiently upward so that it may enter with its corded upper edge 46 the space between the spread apart jaws of the fastener element. Upon subsequent downward motion of the stringer 45 the fastener elements riding thereon will be released by the rails 41 and consequently move with the stringer, while the subsequent fastener element 9 will further descend and again be set onto the rails 41 to be subsequently supplied to the stringer.

In Fig. 1 it is assumed that the collecting chutes 8 are supplied with fastener elements by a single movable supply conduit. Figs. 15 to 19 show an example of a machine which permits to automatically supply fastener elements to the individual collecting chutes.

As had above been described in connection with Fig. 1, the lateral extensions of the uprights 1 of the machine are kept in spaced relation to each other by means of two spindles 3. A plate 4 as shown in Fig. 1 is mounted on these spindles by means of two pairs of bearings 79 and 80 to be displaceable in longitudinal direction. The plate or frame 4 carries on its upper side the distributing container 5 which empties into the supply conduit 6.

Mounted on the supply conduit 6, as shown at 81, is a double-armed locking lever 20, the arms 82 and 83 of said lever terminating in rectangularly bent-off points 84 and 85 which may enter into openings provided in the walls of the supply conduit 6 consisting at least at its under part of an electrically non-conducting material. A contact member 86 is provided somewhat below the point 84, said contact member extending into the supply conduit 6 so that the fastener elements, while being piled up within said conduit, will make contact at 86 without being in any way hampered thereby. A tension spring 87 is associated with the arm 82 tending to move said arm 82 into the position shown. The under arm 83 carries the armature 88 of an electro-magnet 89 which is movable with the plate 4.

The plate 4 is further equipped with two downwardly directed extensions 90 and 91 which serve as bearing members for two spindles 92 and 93 extending transversely to the collecting chutes 8. The spindle 92 serves as a carrier for the feeding member 94 for the plate 4, while the spindle 93 carries a member which prevents unintended motion of the plate 4 into its initial position, thus representing a stop against return motion of said plate. The aforementioned two members are essentially alike as shown in Figs. 17 and 18 and consist of hollow square blocks 94 and 109 and a bushing 95 mounted displaceably on the spindles 92 and 93, respectively. The block 94 is closed up by a cover 96 and the interior of this block a funnel-shaped hollow space 97 into which the bushing 95 projects with its extension 98. The bushing 95 furthermore is equipped with radial extensions 99 which may slide in correspondingly shaped recesses 100 of the block 94, as shown in Fig. 19, in a manner to prevent rotation of the bushing 95 relatively to said block.

As shown in Fig. 17 a ring 101 engages with the inner end surface of the bushing 95, while balls 102 press against this ring in the manner of a ball bearing, a second ring 103 being provided around said balls. The rings 103 serve simultaneously as an abutment for a spring 104 surrounding the spindles 92 and 93. The other end of the spring acts against the cover 96 tending to press the parts 101, 102 and 103 against the bottom of the funnel-shaped hollow space 97 in the block 94 at which time the balls 102 will engage an annular recess 105 of the spindle 92 so that in the position of the parts shown in Fig. 17 the block 94 and the spindle 92 will be coupled by means of the balls 102. The recesses 105 may be separate annular channels or formed as a continuous spiral such as in the case of an ordinary screw thread.

The bushing 95 carries at its outer end an extension of the form of a flange 106 which has an oblique peripheral face 107. The step which is formed by the flange 106 serves as the one abutment for a spring 108 which surrounds the bushing 95, said spring engaging with its outer end the front surface of the block 94 and tending to keep said bushing 95 in the position shown in full lines in Figs. 17 and 18 or to move said bushing 95 into this position.

The member 109 represented in Fig. 18 acts as a stop against return motion of the plate as had above been mentioned and is essentially of a conformation similar to that of the feed member 94 with the exception, for instance, that in the present case a smooth spindle is used. The member 109 is fixedly mounted on the bracket 14.

The upper block 94 carries laterally thereof two pivots 110 as shown in Fig. 16, the upper arm 111 of a double-armed lever 15 being fulcrumed at 16 to the bracket 14 on the upright 1 and engaging with said pivots 110, while the under arm 112 of said lever engages with its free end the armature 113 of an electromagnet 114 fixedly connected to the frame of the machine. The electro-magnet 114 upon being energized by electric current attracts the arm 112 against the action of spring 115, thus pulling said arm 112 from a screw 116 which regulates and limits the deflection of the feed lever 15, said screw 116 being adjustably mounted in the bracket 117 on the upright 1. The blocks 94 and 109 carry at their upper surface a fork 118 which serves as a bearing for a double-armed lever having arms 119 and 120 terminating each into an oblique surface 121 and 122, the arm 119 being bent off rectangularly in downward direction.

The oblique surface 121 in normal position will engage with the oblique surface 107 of the bushing 95. In this case also the construction of the feed member is the same as the construction of the stop which limits return motion.

The spindles 92 and 93 carry at their left-hand end two stops 123 and 124 having the form of collars and at the right-hand end two stop members 125 and 126 of which each carries an upper extension terminating into an oblique surface 127 and 128 which may co-operate with the oblique surfaces 122.

Two tension members 129 serve to exert a pull on the left-hand end of the plate 4, said tension members being guided by rollers 130 fast on the uprights 1 and carrying at their under end a weight 131.

The machine as described in the foregoing operates as follows:

The supply conduit 6 in its initial position together with the plate 4 is positioned at the left-hand end of the machine with the weight 131 in its undermost position. The conduit 6 now overlies the first collecting chute 8 at the left-hand side of the collecting container 7. The levers 82 and 83 are in position as shown in Fig. 15. The end of the supply conduit 6 is therefore closed. As soon as the fastener elements have been piled up within the supply conduit as far as to the contact member 86, an electric circuit for the electro-magnet 89 will be closed by said fastener elements and the locking arm 83 will be attracted by said electro-magnet. By reason of this the fastener elements may now descend into the first collecting chute 8 and at the same time further supply of fastener elements above the hook 84 will be discontinued. As soon as the contact is again interrupted by the emptying of the supply conduit, the electro-magnet 89 will be de-energized and the locking members 82, 83 return into the position shown. Simultaneously with the de-energizing of the electro-magnet 89 the electro-magnet 114 will be energized by a proper switch. In consequence of this the double-armed feed lever or rod 15 will be actuated by the electro-magnet, that is the upper arms 111 will move the upper block 94 in the direction as shown by an arrow in Fig. 17 until the armature 113 is attracted. As the block 94 is coupled with the spindle 92 by means of the balls 102, the spindle 92 will be correspondingly moved towards the right, the plate 4 participating in this motion. The supply conduit 6 will thus be moved forward towards the next collecting chute 8. Security against return motion during forward feeding of the supply conduit 6 is afforded by the stop member 109. As this stop member is permanently at standstill, there will only be displaced the spindle 93 within said stop member during feeding motion of the supply conduit and the spindle will consequently slide along the balls 102 without, however, effecting any displacement between the several balls, such as is the case with the block 94. This sliding motion may take place without impediment, as said motion is directed towards the orifice of the funnel-shaped hollow space 97 in the block 94.

The electro-magnet 114 is energized intermittently and when being de-energized the spring 115 will again retract the feed lever into the position shown in Fig. 15. The stop itself is adjustable by the screw 116.

Whenever the electro-magnet 114 is de-energized, the electro-magnet 89 is energized as above stated and consequently the collecting chutes 8 will be supplied and operated in the aforedescribed manner.

With increasing displacement of the plate 4 in the direction indicated by the arrow in Fig. 15 the rings 123 and 124 will move gradually towards the right and finally abut against the flanges 106 on the block 94 and the stop member 109. In the course of subsequent feeding motion the flanges 106 are moved by the rings 123 and 124 into the position shown in dash-dotted lines in Fig. 18 and in consequence thereof the arms 119 will come in front of the front surfaces of the flanges 106, while the rear oblique surface 122 of both members 94 and 109 will move into the position shown in dash-dotted lines. During concomitant displacement of the bushing 95 the series of balls 102 in both members will be moved into the funnel-shaped space 97, the contact between the spindles 92 and 93 will be interrupted and the spindles 92 and 93 with the plate 4 may now return into initial position by action of the weight 131. In this condition of the operating parts of the machine the oblique surfaces 127 and 128 engage with the oblique surfaces 122, the pawls 119 and 120 thereby returning into initial position so that the bushing 95 with the balls 102 may likewise return into initial position by action of the springs 104 and 108.

All operating parts of the machine have now again assumed their initial position and the collecting chutes 8 can now again be automatically supplied with fastener elements as had above been described.

Figs. 20 and 21 show a construction of a modified stop mechanism which prevents return motion of the plate 4 together with the distributor 5 and the supply channel 6, this construction being different from the stop mechanism shown in Figs. 15 to 19. An example of the construction of this modified stop mechanism is shown in Figs. 20 and 21 in two different positions.

According to Figs. 20 and 21 the plate 4 is provided with extensions 90 and 91, the same as in Figs. 15 to 19, said extensions serving as bearing members for the spindles 92 and 93. The block or feed member 94 is mounted, the same as in Figs. 15 to 19, upon the spindle 92 and operated by the rod 15 which is fulcrumed at 16 to the bracket 14. The rod 15 can be reciprocated at its under end, in the present case by an eccentric 17 with which the rod 15 co-operates by action of a spring 115. The shaft 132 carrying the eccentric 17 will thus be rotated, whenever it is intended to exert a feeding motion upon the plate 4.

At the upper end of the rod 15 there are mounted at 133 suspension rods which are connected at their under ends by a bolt 135 which passes through a window 136 in the rod 15 and which is flattened at this place as shown at 137. The rod 134 therefore will be carried towards the right, whenever the rod 15 is rocked, the pivot 135 abutting against the left-hand edge of the window 136.

Underneath the window 136 there is mounted on the frame of the machine at 138 a pawl 18 having a toothed under surface which engages with threads 139 on the spindle to lock the latter. The pitch of the thread on the spindle 93 is in agreement with the stroke of the feeding motion which is again equal to the distance between two collecting chutes 8. The pawl 18 carries at its upper surface a nose 140 which may engage with the flattened portion 137 of the bolt 135, as soon as the pawl 18 has arrived into its uppermost position shown in Fig. 21. This position of the pawl 18 is brought about by means of the slide member 141 which is of frame-like conformation and mounted longitudinally displaceably on the machine. The pawl 18 enters the aperture of the frame-like slide member 141, this aperture serving simultaneously as a control organ for said pawl. For this purpose the pawl 18 is provided with an oblique surface 143 which co-operates with another oblique surface 144 on the slide member 141. If the slide member 141 is moved from the position shown in Fig. 20 into the position shown in Fig. 21, the pawl 18 will be lifted by action of the oblique surfaces 143 and 144 and assume the position shown in Fig. 21. In this manner the spindle 93 will be disengaged from the pawl 18, thus releasing locking of said spindle against return motion.

The aforementioned motion of the slide member 141 is effected by a release organ 145 which is of the form of a collar adjustably mounted on the spindle 93, said release organ 145 abutting against the left-hand edge of the slide member 141 and moving the latter in the manner just described. Motion towards the left will similarly be imparted to the slide member 141 by a second control organ 146 which is similar to the release organ 145.

A further control rod 147 is pivoted to the suspension rod 134, said control rod leading to the rod 149 which is fulcrumed to the bracket 14 as shown at 148. The rod 149 abuts with its upper end against the flange 106 which forms part of the inner bushing 95 of the feed member 94. Upon motion of the suspension rod 134 into this position shown in Fig. 21 the rod 149 will be rocked accordingly, thus moving the bushing 95 in the manner as had been described hereinabove in connection with Figs. 15 to 19, with the effect that the balls 102 will be uncoupled from each other to temporarily discontinue feeding motion.

In this position the spindles 92 and 93 may return into their initial position. When the spindles 92 and 93 have arrived in this position the pawl 18 is again moved back into locking position by the inner right-hand edge of the window in the slide member 141 which is moved towards the right by the above mentioned second collar 146 on the spindle 93; in like manner the suspension rod 134 will again be moved into its initial position by action of the spring 104.

Motion of the several operating members of the machine as shown in Fig. 21 and uncoupling of the spindle 92 evidently takes place, whenever the pivot 135 stops the pawl 18 in lifted condition or whenever in the opposite way the suspension rod 134 is prevented by the pawl 18 against moving into the position shown in Fig. 20. As long as the pawl 18 is kept in its undermost position, displacement of the pivot 135 within the window 136 as shown in Fig. 21 cannot take place and consequently during feeding motion of the rod 15 the levers or rods 134, 147 and 149 will participate in this motion together with the feed member 94.

In the case of Figs. 15 to 19 it had been assumed that feeding motion of the supply conduit 6 is effected by electro-magnetic means, an electric contact being made by the fastener elements 9, said contact controlling an electro-magnet which acts upon the locking mechanism 20. Figs. 22 to 24 show an example of construction of the control organs for the locking mechanism, the control in this case taking place purely in a mechanical way by closing an electric contact by a member of said mechanism, thereby effecting feeding motion of the supply conduit towards the next collecting chute 8. Fig. 22 in particular relates to the distributor.

The fastener elements 9 are at first irregularly stored up in a storage container 5 which consists of a fixed base-plate 150 with a laterally bent up rim 151 within which a plate 152 may rotate. This plate 152 extends closely to the rim 151 and is provided at its periphery with recesses 153 which are of a conformation permitting the fastener elements 9 to enter the space between the recesses 153 and the inner surface of said rim 151. The normal position of the fastener elements is that position in which they are positioned with their elevated part 154 towards above, said elevated part acting as the locking element proper of the fastener. This position of the fastener elements may be brought about by resilient scrapers which are more fully described herein further below.

The supply conduit 6 which by means of curved path 155 communicates with the plate 152 permits the fastener elements with their elevated parts 154 to slide downward along this path and to pass into the supply conduit 6. Within this supply conduit the fastener elements are carried further in vertical direction, the elevated parts serving as a proper guide, and thereupon said fastener elements are introduced into a slot 156. The conduit 6 empties in the above described manner above the collecting chutes 8.

Adjacent the supply conduit 6 there is mounted a shaft 157 in a member 164 which is a prolongation of the extension 96, a bushing 158 associated with a pulley being rotatably mounted on said shaft 157. The pulley 21 which serves as driving member is firmly connected to the bushing 158 so that the latter will rotate upon rotation of said pulley. The pulley 21 is further provided with an extension 159 fast thereon which extension is consequently rotated together with said pulley and said bushing. The bushing 158 further carries at its periphery a smooth reinforced part 160, a threaded part 161 of greater diameter than the part 160 and a second smooth part 162 which is of greater diameter than the part 161.

A ring 163 is rotatably mounted on the bushing 158 intermediate the parts 159 and 160, said ring carrying at its periphery a pointed pin 22 as shown in Figs. 22 and 23. Upon rotation of said ring the pin 22 may enter the slot 156 in the supply conduit 6. The ring moreover is resiliently coupled with the pulley 21 by a spring 165 as shown in Fig. 22 so that said ring will positively but resiliently participate in the rotation of the pulley 21.

Within the ring 163 there is further mounted longitudinally displaceably in a recess 166 a bolt 167 which is pressed by action of a spring 168 with its front part 169 against an oblique surface 170 on the extension 159 of the pulley 21. Upon rotation of the pulley 21 the bolt 167 is displaced by the oblique surface 170 with respect to said ring 163 so that said bolt will project with its outer end 171 out of the right-hand front surface of the ring 163.

A bearing 172 is mounted on the supply conduit 6 and a suspension member 174 is fixed to said bearing swingably round an horizontal pivot 173, said suspension member terminating above said pivot into a bolt 175 which forms the fulcrum point for a double-armed lever. The one arm 176 of this double-armed lever extends in direction towards the aforementioned parts 160, 161 and 162 in a manner that it will be moved and guided to a certain extent by these parts in horizontal as well as in vertical direction. The arm 176 for this purpose is equipped at the under portion of its front end with a lens-shaped extension 177 which may eventually be movable with respect to said arm. The extension 177 terminates into a knife-edge which in the one position shown rests upon the part 160. The front edge of the arm 176 further carries in lateral direction thereof an extension 178 with which the pivot or bolt 167 may co-operate in such a way that said bolt or pivot upon coming out of the right-hand front surface of the ring 163 moves the arm 176 towards the outside and carries the same towards the thread 161 which owing to its rotation will rock the arm 176 round its fulcrum point towards the outside. The arm 176 will thus finally engage with the outer part 162 and at the same time be lifted by the latter to come with its front end into the position shown in Fig. 23 in dash-dotted lines.

Rocking motion of the arm 176 takes place against the action of a spring (not shown) which tends to move said arm back into the position shown in Fig. 23 in full-drawn lines.

Backward rocking motion of the arm 176 can only take place after the latter has arrived at the part 162, by action of a bridge 179 which engages with the arm 176 at the front extension 180 thereon as shown in Fig. 24. The arm 176 after sliding along the bridge 179 is again carried back into its undermost position and is maintained in raised position during a certain period of time.

During raising and lowering of the arm 176 the suspension member 174 will be rocked accordingly around its fulcrum point 173. At the under part of the suspension member 174 is provided an oblong slot 181 co-operating with a bolt 182 adjustably fixed within a second guide slot 183 in the upper arm 184 of a double-armed lever fulcrumed at 185 to the frame of the machine. The upper arm 184 and the under arm 186 of this lever form part of the locking mechanism 20 shown in Fig. 1 and are equipped for this purpose at their free ends with the locking pins 187 and 188 which may alternately enter the supply conduit 6 in accordance with their temporary position which is controlled by the bolt 182.

The arm 176 is connected with another arm 189 at an angle to the former, said other arm 189 thus forming the second arm of the double-armed lever which may be rocked around its fulcrum point. The arms 176 and 189 thus will make a rotary as well as a lifting motion as soon as the arm 176 is subject to the action of the parts 161 and 162.

The arm 189 carries at its free end an adjusting screw 190 which co-operates with a contact 191, the supply conduit 6 being moved forward to the next collecting chute 8 by the closing of said contact.

In normal position of the arm 176 on the member 160 it will be in its undermost position and accordingly the double-armed lever 184, 185 forming part of the locking mechanism will be in a position opposite to that represented in Fig. 24. The supply conduit 6 consequently will be closed at its under end and the fastener elements now may be stored up within this conduit. The ring 163 rotates continuously with the pulley 21. As soon as the stack of fastener elements in the conduits 6 has reached a certain height, the pin 22 abuts against the uppermost fastener element, the ring 163 is thereby locked, while the bolt 167 projects out of the ring and moves the arm 176 towards the outside to engage with the thread 161. The arm 176 therefore is rocked in lateral direction and the arm 189 moves correspondingly. The arm 176 is finally lifted and actuates the locking mechanism discontinuing further supply of fastener elements, at the same time permitting the fastener elements stored up within the supply conduit to discharge from the under end thereof. This condition is maintained until the arm 176 has returned by action of a spring past the bridge 170 into its initial position. Simultaneously with the opening of the under end of the supply conduit 6 the latter will be moved forwards towards the next collecting chute 8 which will now be filled with fastener elements. The performance of these parts is now repeated.

Feeding motion is imparted to the supply channel 6 as above described by the closing of the contact 191. The electric circuit thus established includes an electro-magnet 192 indicated in Figs. 25 and 26 which is mounted horizontally on a vertical plate 193 fast on the transverse member 2 of the machine. The plate 193 further forms a bearing 194 which serves for the reception of a shaft 132 actuating the eccentric 17. The latter co-operates positively with the swinging lever 15 and feeds step by step the supporting plate 4 and therewith the supply conduit 6 in the manner above described.

Upon the front part of the shaft 132 is mounted loosely rotatably thereon the driving pulley 195. The pulley 195 is connected with a toothed disk or ratchet wheel 196 which participates in the rotation of said pulley.

The shaft 132 further carries a crank 197 fast on said shaft adjacent the ratchet wheel 196. A pawl 198 is pivoted to the outer end of said crank 197, said pawl being pressed in direction towards the ratchet wheel 196 by means of a spring (not shown). This spring tends to keep the edge 199 of the pawl 198 in engagement with the ratchet wheel 196.

Figure 26:
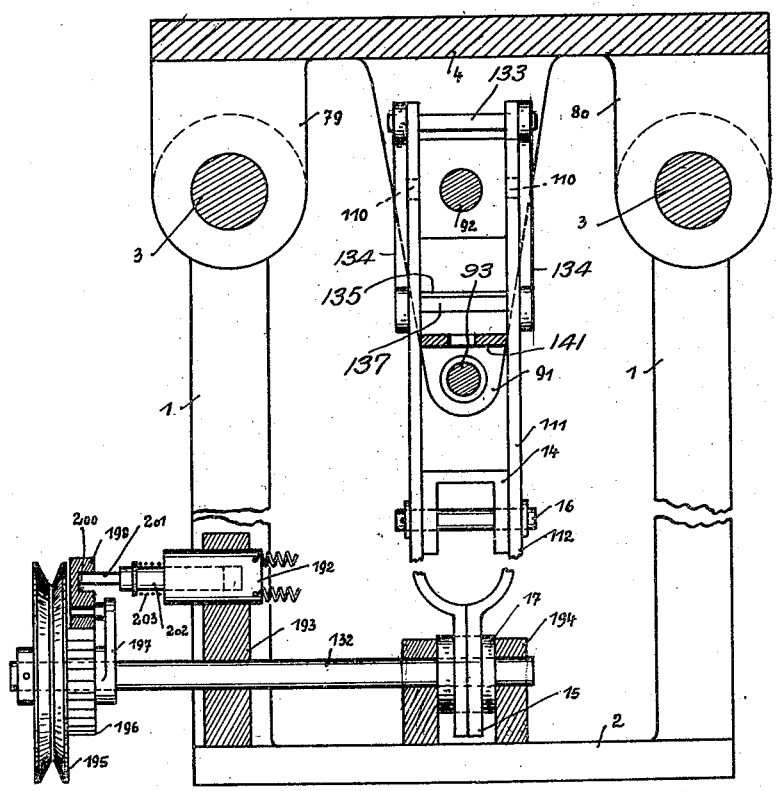

An arched slot 200 is provided in the pawl 198 and a bolt 201 extends into said slot in the manner shown in Figs. 25 and 26. The bolt 201 forms an extension of the armature 202 of the electro-magnet 192 and is kept under the action of a spring 203 which tends to move said bolt into the position shown in Fig. 25.

The pulley 195 rotates continuously in the direction indicated by the arrow in Fig. 25. The pawl 198 is out of engagement with the ratchet wheel 196 and therefore the latter only will participate in the rotation of the pulley 195. If now the electro-magnet 192 is energized by closing the contact 191 as shown in Fig. 23, the bolt 201 is drawn out of the slot 200 and the pawl 198 may now follow the force of its spring and consequently said pawl and the shaft 132 will be coupled with the pulley 195 by way of the crank 197 so that the eccentric will likewise rotate and impart feeding motion to the supply conduit 6.

As the electric circuit of the electro-magnet 192 is only temporarily closed, the bolt 201, immediately after the slot 200 has come out of the range of action of said bolt in consequence of proper rotation of the pawl 198, will again move back into its original position. The slot 200 now again actuates the bolt 201 which is disengaged from the ratchet wheel 196, so that the several parts will again assume their original position. The shaft 132 carrying the eccentric 17 will therefore automatically make a single rotation, whenever the electro-magnet 192 is energized.

Fig. 25 further shows an example of a special bearing for the spindle 93 permitting to adjust the plate 4 and therewith the supply conduit 6 relatively to the collecting chutes 8.

The spindle 93 is mounted at its left-hand end by means of a thread in the downwardly extending arm 93 of the supporting plate 4 and terminates into a square head 205 (see Fig. 25) permitting adjustment of said spindle parallelly to said supporting plate. Adjusting the spindle 93 will cause displacement with respect to the pawl 10 and the collecting chutes 8, as the pawl 10 is fixed to the frame of the machine, while the supply conduit 6 again is connected to the supporting plate 4. A fine adjustment of the spindle 93 will thus be possible.

After each adjustment of the square head 205 on the spindle 93 the latter will be fixed in its temporary position by drawing tight the nut 207 on the right-hand end 208 of said spindle.

The mode of conveying the fastener elements 9 from the distributor 5 into the supply channel 6 is shown in an exemplification in Fig. 22 and has been described hereinabove. In order to more properly convey the fastener elements from the distributor 5 to the supply conduit 6 there is provided, as shown in Fig. 27, a disk 209 which rotates continuously in the direction shown by the arrow and enters the distributor from the side thereof so that the fastener elements 9 adjacent the supply conduit 6 rest on said disk 209 and a proper impulse is given to said fastener elements. The disk 209 is mounted in a suitable bearing and the direction of rotation of said disk is such that this impulse will likewise carry the fastener elements towards the supply conduit 6 and now in addition press said fastener elements against the right-hand arched front of said conduit.

Troubles which may eventually arise in case of improper guiding of any fastener element and failure of properly supplying the fastener elements are automatically indicated by standstill of the machine. A special device is provided for this purpose of which an example is shown in Figs. 27 and 28.

According to Figs. 27 and 28 the upper end of the supply conduit 6 adjacent the distributor 5 is made resilient so that a fastener element 9 which enters the supply conduit 6 in an irregular position will lift with its left-hand jaw the resilient end of the supply conduit. A double-armed lever is fulcrumed to the supply conduit 6 as shown at 212, one arm 213 of said lever extending in downward direction and acting upon an electric contact 214 in such a manner that upon raising the other arm 211 of said lever the contact 214 will be closed and cause the machine to come to standstill.

A device which is in principle identical with the device just described is also present at the under end of the supply conduit 6 as shown in Figs. 27 and 28. In this case also the under end 215 of the left-hand wall of the supply channel 6 is made resilient and the arm 216 of a double-armed lever fulcrumed to the supply conduit at 217 contacts with the under end of said supply conduit, while the other arm 218 of said lever actuates an electric contact 219. If therefore any irregularity should arise at the under end of the supply conduit owing to the left-hand half of a fastener element being out of its normal path of motion, the end 215 of the supply conduit 6 will be lifted and likewise cause the machine to come to standstill.

Evidently a device of the kind just described or of any other suitable construction may also be provided at other places of the supply conduit at which irregularities in the position of the fastener element may be expected to arise.

In order to avoid troubles during motion of the fastener elements, especially within the supply conduit and the collecting chutes, it has further been found necessary to make the fastener elements as much as possible exactly alike and to avoid any burrs or other irregularities thereon. However, formation of burrs during making the fastener elements cannot always be safely avoided, especially if these elements are made by stamping the same out of a blank of sheet metal. According to my invention the distributor—if a distributor is present at all—is further utilized to automatically subject the fastener elements to a proper surface treatment, especially on their under surface on which said elements rest upon the plate 150 of the distributor 5.

Figs. 29, 30 and 31 show an example of a device which serves to subject the fastener elements to a treatment of the kind indicated. At a certain place on the periphery of the distributor, preferably in proximity to the supply conduit 6, there is mounted a plug or similar member 220 on the distributor plate 150 adjacent the rim 151 thereof, said plug being provided with a transverse slot 221 having its upper edges positioned flush with the surface of the plate 150 and worked out as sharp as possible to act as cutting edges. On top of the rim 151 there is mounted a resilient plate 223 in direction of the transverse slot 221 by means of a screw 222, said resilient plate 223 cooperating with a block 224 having a slot 225 therein. The slot 225 extends through the block 224 and is further so arranged that the fastener elements 9 during rotation of the plate 152 will pass with their elevated parts 154 which act as locking elements proper of the sliding clasp fastener through the slot 225. Simultaneously with the passage of the fastener elements through the slot 225 a pressure will be exerted upon the fastener elements owing to the resiliency of said plate 223 and said block 224, this pressure serving to cut off or otherwise remove the burr which may eventually be present at the fastener elements by moving the under surface of each fastener element past the upper cutting edges of the slot 221. The burr thus removed from the fastener elements may now be disposed of through the slot 221 in downward direction.

A device for proper surface treatment of the fastener elements will also be desirable in case a machine of the kind shown in Fig. 2 is used in which the fastener elements are carried immediately upon making the same into the supply conduit. An example of a construction of this kind is described herein further below.

For the proper operation of the machine—as far as it works with a distributor—it is further necessary to have as many fields near the rim of the distributor filled with fastener elements in proper position with their elevated parts— which act as locking members proper of the sliding clasp fastener—upwardly directed.

Figure 33:
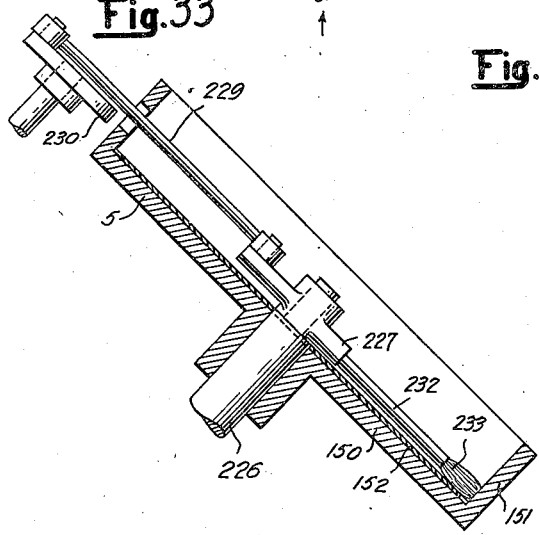

Figs. 32 and 33 show an example of a device which serves to comply with this requirement. According to Figs. 32 and 33 a shaft 226 extends from below in direction of the axis of rotation of the plate 152 through the fixed bottom 150 of the distributor. The shaft 226 carries a hub 227 fast thereon, a crank 228 being connected to said hub and a rod 229 pivoted to the end of said crank. The rod 229 is set into swinging motion by a rotating crank disk 230.

A second extension 231 on the hub 227 carries an arm 232 having its front end equipped with bristles 233 which are preferably positioned within a plane parallel to the plane of the distributor plate 152 and pass over the marginal fields 153 of the latter. The arm 232, moreover, is positioned at a certain distance from the surface of the plate 152.

The brush which is formed by the arm 232 and the bristles 233 thereon swings to and fro within two end positions shown in Fig. 32, while the plate 152 rotates in the usual manner in the direction of the arrow. The brush is properly mounted to make this swinging motion near the bottom of the inclined distributor 5, that is at that place at which the loosely filled-in fastener elements will collect. By swinging said arm 232 with the bristles 233 thereon the filled-in fastener elements will be distributed flat over the bottom of the distributor. Experience has shown that the performance of the distributor may be considerably improved by providing a device of the kind just described.

In the direction of rotation of the plate 152 there is further provided one or more blade springs 234 on the rim 151 of the distributor, said springs extending into the interior of the distributor and contacting at their under free ends with the recesses near the rim 151. At the under end the blade springs 234 are provided with cut-away portions which are properly arranged and dimensioned to permit passage of the elevated parts 154 of the fastener elements without obstruction. In consequence of this the fastener elements which are in proper position in the distributor will not further be acted upon by the springs 234. In Fig. 34 the left-hand spring 234 is shown in such a position.

If, however, a fastener element is in a wrong position in the distributor, that is to say, if the elevated part 154 of a fastener element is directed towards below, the edges of the spring which are laterally adjacent to its cut-away portion 235 on account of the oblique position of the respective fastener element will exert a pressure against the projecting edges of the bottom of the distributor plate and thereby throw the respective fastener element out of the marginal field near the rim 151 upon further rotation of the plate 152. In Fig. 34 the first part of such a motion of a fastener element 9 is indicated in dotted lines.

As far as in the aforedescribed construction the supply of fastener elements to the collecting chutes is effected by a distributor, it had been assumed that a single distributor is used. As above mentioned, however, a plurality of supply conduits may also be used and a distributor may be associated with each supply conduit. In such case therefore a multiple system of supply conduits and distributors is used. A construction of this kind, however, is connected with the drawback that the collecting chutes may eventually be filled with fastener elements in an irregular way, because the several distributors do not operate exactly alike. My invention now provides a further construction which permits to store up the greatest possible amount of fastener elements within the distributor and the supply conduit, thus attaining the greatest possible working capacity of the machine. The capacity of the storage containers, in other words, should be utilized to the greatest possible extent.

In Figs. 35 and 36 I have shown an example of a construction of this kind and in Figs. 37 and 38 a construction which is a modification of that shown in Figs. 35 and 36.

According to Fig. 36 there is provided one distributor 5 with a supply conduit 6 which supplies fastener elements to the collecting chutes 8 in the manner so far described.

According to Fig. 35 a second supply conduit 6' comes from a second distributor 5' and joins the supply conduit 6, said second distributor 5' being of the same construction as the distributor 5. Both distributors 5 and 5' act in like manner and may be placed, for instance, adjacent to each other as shown in Fig. 35.

In order to avoid stowing of the fastener elements at the place of junction of the two conduits 6 and 6', my invention further provides an oscillating locking member 236 which may alternately enter the one or the other of the supply conduits 6 and 6'. The supply conduit which is common to both distributors 5 and 5', that is that part of the supply conduit underneath the locking member 236, as well as the collecting chutes 8 will therefore practically be supplied continuously. The mode of operation of the double supply conduit shown in Fig. 35 may in other respects be the same as had previously been described herein. With the construction according to Fig. 35 there will always be a provision of a sufficient number of fastener elements piled up within the supply conduit underneath the locking member 236.

The second form of construction with two distributors 5 and 5' is shown in Figs. 37 and 38. In this case the distributor 5 is arranged in the rear of the distributor 5' and connected with the latter by a conduit 237, the distributor 5' serving to fill up the marginal fields which have remained free in the distributor 5. The fastener elements may be supplied to the distributor 5 by the aid of a special device associated with the rear end of the conduit 237, said device consisting essentially of a flexible extension 238 of the conduit 237. The free end 240 of said flexible extension may thus be moved over the marginal fields 153 of the distributor 5. The flexible extension 238 furthermore carries a stop 241 in front of the orifice of the conduit 237.

If the marginal fields 153 are filled with fastener elements, the stop 241 on the flexible extension 238 will be positioned in front of the undermost fastener element within the conduit 237 and prevent further supply of fastener elements to the distributor 5. In case, however, one marginal field 153 of the distributor 5 is empty, the flexible extension 238 enters the recess on said marginal field with the effect that the stop 241 is sufficiently lowered to release the undermost fastener element in the conduit 237. The fastener elements may now slide out of the conduit 237 along the flexible extension which is properly profiled into the marginal field 153 which in the meanwhile has been further moved forward as indicated by the arrow in Fig. 37.

After passage of the marginal field the flexible extension 238 will again return into its initial position and lock the conduit 237 by the stop 241 preventing further supply of fastener elements by said conduit.

The device shown in Figs. 29 to 31 which serves for removing burr at the under side of the fastener elements will be of still greater importance, if this device operates in the manner of Fig. 2 according to which the fastener elements which have been stamped out by the dies 25 are immediately supplied to the collecting container 7 through the conduits or chutes 30. In this case especial care must be taken to free the fastener elements of any burr thereon and further of any oil and soap which may adhere thereto from the stamping operation. An example of a device of this kind is shown in Figs. 39, 40 and 41.

Figure 39:
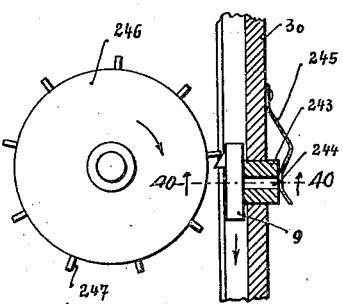
Figure 41:
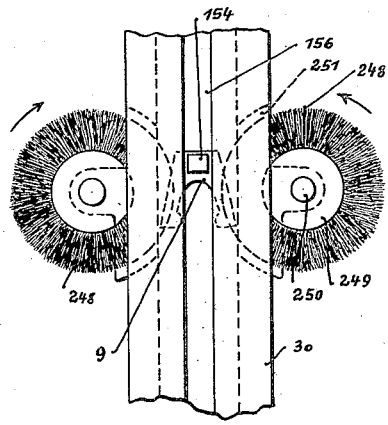
Figure 40:
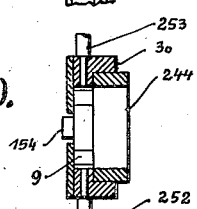

According to Figs. 39, 40 and 41 the fastener elements 9 are conveyed in the usual manner within the conduit 30 to slide with their elevated part 154 within a slot 156 of said conduit. In the rear wall of this conduit there is inserted a grinding member 220 as shown in Figs. 29 to 31. According to Figs. 39 and 40 there is likewise provided a grinding member 243 with a slot 244 therein having upper edges which are as sharp as possible so that the fastener elements during moving past said edges will be properly ground. The member 243 is pressed against the fastener elements 9 by a spring 245 to produce the pressure which is necessary for the aforementioned grinding.

Motion is imparted in this case to the fastener elements by a continuously rotating wheel 246 which carries a series of pins 247 at its periphery, said pins abutting against the elevated part 154 of the respective fastener element and causing the latter to move downward in the direction shown by the arrow in the conduit 30. As soon as the respective fastener element has moved out of the range of action of the member 243 it will continue its free falling motion.

According to my invention further means are provided for cleaning and polishing the fastener elements during passing the member 243, and if necessary also at other places of the conduit 30. These further means consist, as shown in the drawings, of two continuously rotating disks 249 which are mounted at 250 on the conduit 30. The peripheries of the disks 249 enter cut out portions in the walls of said conduit sufficiently far to permit cleaning and polishing of the fastener elements especially at the jaws thereof during passing the conduit 30 intermediate said disks 249.

In order to dispose of the metal dust which is produced during the aforementioned treatment of the fastener elements and to supplement such treatment, pressure air may be used in addition, said pressure air being supplied in transverse direction to the conduit 30 by means of the air supply conduit 252 and the air discharge conduit 253 shown in Fig. 40.

In case an arrangement is used in accordance with Fig. 2, further care should be taken to carry the fastener elements which during the process of making the same are at first positioned horizontally into a vertical position, one possibility of this kind being shown in Fig. 42 and another in Figs. 43 and 44.

According to Fig. 42 the direction of motion of the fastener elements 9 is changed within the several conduits 30. For this purpose the conduits 30 are of oblique conformation and properly enlarged at their upper part so that the fastener elements immediately upon being made will be carried along an oblique track 254 which is immediately adjacent the die plate 255 with which the dies 25 co-operate. The several fastener elements after having passed the die plate 255 will thus be introduced into the upper enlarged end of the conduit 30 and more particularly carried against the oblique track 254 forming part of said conduit.

According to Figs. 43 and 44 the fastener elements after having passed the die plate 255 are carried to a disk 256 which rotates continuously in the direction indicated by the arrow. As Fig. 44 shows the disk 256 is of a proper profile at its periphery permitting reception of the fastener elements with their elevated parts 154 fitting the profile. After a quarter revolution of the disk 256 the fastener elements will be carried from the upper oblique part of the conduit 30 into the under vertical part which forms a continuation of said upper oblique part.

Another device for supplying fastener elements to the stringer may consist of a drum of the kind of a so-called mixing drum. The drum is rotated and provided with receiving organs for putting the fastener elements into proper position. These receiving organs may be of various constructions as shown, for instance, in Figs. 45 to 47.

The receiving organ forming part of the construction shown in Figs. 45 to 47 consists of two threaded spindles 273 and 274 the profile of the thread being properly dimensioned to cause the fastener elements to assume a position side by side in the several turns of the thread and properly spaced at distances which they shall finally assume on the stringer.

The spindles 273 and 274 are rotated in opposite direction to each other, the fastener elements consequently moving from one to the other end of said spindles and being kept at that place at which the spindles have the smallest distance from each other as shown in Fig. 46.

At their front ends the spindles 273 and 274 extend into a rotating drum 275 which at its one end is closed and at its other end sufficiently open permitting the spindles to project out of the drum, at the same time preventing, as much as possible, any fastener elements against falling out of the interior of the drum.

The drum which is rotated continuously from the outside in any suitable manner is equipped at its interior circumference with ledges 276 extending in longitudinal direction of the drum. The ledges 276 will thus lift the fastener elements which had been loosely poured into the drum and cause said elements to fall onto the spindles 273 and 274.

The fastener elements, more particularly, will fall onto the spindles 273 and 274 either in longitudinal or in transverse position. In the first case the fastener elements fall through the slot 277 between the spindles and are thus again carried back to the bottom of the drum, while in the second case the fastener elements fall with their elevated part in a definite direction in transverse position onto the spindles 273 and 274 and assume the position shown in Fig. 46 to be carried by said spindles towards the outside. Those fastener elements, however, having their elevated parts directed in the opposite way will fall below by reason of the proper profile of the threads of the spindles, shown in Fig. 45, and are now either carried again back into the drum or into the collecting chutes 278 which extend underneath the spindles in like direction therewith. After being filled with fastener elements the collecting chutes 278 may be taken out of the machine.

After the spindles 273 and 274 are covered up with fastener elements and any gaps filled up in some suitable way, the fastener elements may be taken off the spindles by means of a special device or automatically fall into the chute 279 which is positioned approximately at the end of said spindles. The fastener elements fall off the spindles on account of the fact that the two opposite threads at the respective place of the spindles are of such a profile, as shown at 280 and 281 (Fig. 45), that there will be no further support for the elevated parts 154. The fastener elements which fall off the spindles are thus carried into the chute 279.

Instead of two spindles it is also possible to use a single spindle, the other spindle being in this case re-placed by a fixed abutment. An arrangement of this kind is shown in Figs. 48 and 49.

Figure 48:
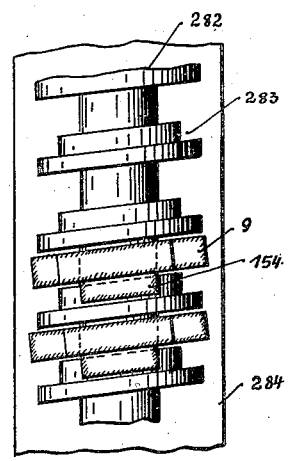
Figure 49:
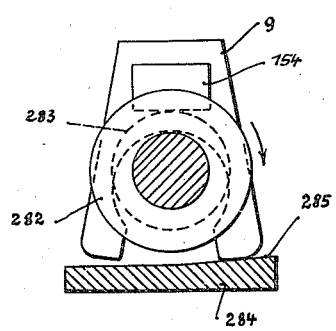

In this case one spindle, for instance 282, is again equipped with screw-like threads as shown in Fig. 48 in which for the sake of simplicity the under half of the spindle is omitted. Upon rotation of the spindle the fastener elements within the threads and consequently in contact with the core of the spindle will be moved forward in longitudinal direction thereof.

The profile of the thread is again of a conformation causing the fastener elements contained therein to assume as a rule their normal position, while in every other position the fastener elements will again fall off the spindle. This normal position of the fastener elements on the threaded spindle 282 is shown in Figs. 48 and 49. In order to keep the fastener elements in this normal position, a collar 283 adjacent the several threads enters the elevated part 154 of the fastener elements as may be seen from Fig. 49. By this the fastener elements are kept in proper position relatively to the spindle and move forward on the latter, the jaws of the fastener elements being now supported by the plate 284 which acts as an abutment. One half of the upper surface of this plate is somewhat inclined as shown at 285 in Fig. 49, in order to cause the fastener elements which by reason of the rotation of the spindle and the friction thereon will be given a certain oblique position to assume again a vertical position with respect to said plate as a whole.

If the fastener elements which are within the drum in which, for instance, the aforedescribed single spindle may be used fall with their elevated part in downward direction onto the spindle, they will immediately slide off the latter. In like manner the fastener elements will slide off the spindle, whenever the elevated part 154 is of a direction different from that shown in Fig. 48.

The fastener elements may be taken off the single spindle in a manner similar to that which had above been described in connection with two spindles, or said fastener elements may be carried into a chute by said single spindle, and said device of Figs. 45 to 49 may be employed for feeding the fastener elements into chutes through which the elements are supplied to a storage container similar to that of Fig. 1, from which said elements are supplied in groups to the mounting tape.

As so far described herein and shown in the accompanying drawings, it had been assumed that the template as a whole forms a rigid body, that is to say that the several parts of the templates are immovable relatively to each other. While it is possible to accelerate delivery of the fastener elements to the templates by automatic means, such acceleration will by no means be sufficient for mass production, if templates are used which are of the heretofore known construction. Moreover, templates of known construction are rather expensive. These disadvantages are avoided by my invention by providing a novel construction of template rendering the same more suitable for mass production and reducing the cost of making the template. Figs. 50 to 55 show this novel construction of template permitting continuous delivery of fastener elements thereto. According to Figs. 50 to 55 the template consists of two endless bands which serve for reception of the stringer therebetween and for imparting motion of their own to said stringer.

According to Figs. 50 to 52 the stringer 45 is carried through the machine in the direction shown by the arrow. In this case the apparatus consists essentially of two endless bands 301 and 302 consisting, for instance, of steel. The bands 301 and 302 are carried parallelly to each other at a proper distance to grip the stringer 45 to which the fastener elements are delivered at least at the upper bead or corded edge of the stringer in such a manner that during motion of said endless bands in the direction of the arrows the stringer 45 will be properly moved together with said endless bands.

The two endless bands 301 and 302 are mounted on rollers 303 and 304 rotatably mounted at 305. At the periphery of the rollers there are provided pins (not shown) which engage with suitable holes in the endless bands 301 and 302.

The endless bands 301 and 302 are driven to rotate in full synchronism with each other, with the result that the two bands 301 and 302 will permanently be maintained in the same position relatively to each other. This is necessary in order to keep the gaps 306 which form part of the template always in position exactly opposite each other.

Within the space between the two halves of the endless bands there are mounted rails 307 and 308, said rails being moved by means of rods 309 and 310 in direction of the arrows (Fig. 52) towards the interior adjacent halves of said bands 301 and 302. The rails 307 and 308, moreover, are arranged, as shown in Figs. 50 to 52, at such a height that they will hit, when being displaced, against the jaws of the fastener elements 9 and consequently compress said jaws in direction towards each other to fix the same and therewith the fastener elements as a whole in known manner to the re-inforced edge 46 of the stringer 45.

In the construction shown it is assumed that the fastener elements are stored up within the collecting chutes 8; the storage container 7 accordingly is mounted above the interior adjacent halves of the bands.

The mode of operation of this construction is such that at first the stringer 45 is carried into a position underneath the collecting chutes 8 by the rollers 303 and 304 and that thereupon the fastener elements are set in the above described manner onto the stringer after the latter has come to standstill. The fastener elements are thereupon fixed to the stringer by proper motion of the rails 307 and 308, while the so prepared stringer is further moved by imparting a repeated motion to the bands 301 and 302, a new piece of stringer being placed simultaneously with this motion into position underneath the collecting chutes 8. If it is desired to mount fastener elements on the stringer over a greater length of the latter and of a number equal to that of the collecting chutes 8, care must be taken to move the stringer forward a proper distance.

On the other hand, if it is desired to mount fastener elements on the stringer only over a relatively short portion of the stringer, the latter is left free at the other portion thereof which subsequently may be cut out of the stringer.

In the second example of construction shown in Figs. 53 to 55 an endless band is carried round two rollers or disks 311 and 312 which are provided with double rims, said endless band being of comb-shaped conformation and composed of several members 313 which in straight condition of the band are at uniform distances from each other in agreement with the distances between the chutes 8 so that the gaps between the members 313 may be used as spaces from which the fastener elements 9 are delivered to the stringer.

The stringer 45 in this case is introduced into the gaps between the two rows of members 313 and the band which carries these members is moved, for instance, underneath the collecting chutes 8 in the manner described hereinabove and shown in Figs. 50 to 52. Fastener elements will now be supplied to the gaps between the members 313 and subsequently delivered to the stringer 45 in proper position thereon.

The two rows of members 313 which are directed and moved longitudinally adjacent each other to constitute the movable template will thus be passed along the orifice of the collecting chutes 8 at proper distances from each other, as indicated in Fig. 54. Guide rollers 314 serve for properly guiding a movable template of the described kind, said guide rollers 314 contacting laterally with the two rows of members 313. In the rear of the guide rollers 314 the stringer 45 upon which the fastener elements 9 are mounted is left free for further treatment and for this purpose the two parts of the template are moved obliquely towards the side and carried round the disks or rollers 312. Further small rollers 315 as shown in Fig. 54 serve for additional lateral guiding. The disks or rollers 312 are mounted upon a shaft 316 by the intermediary of a spacing member 317 which keeps the two disks or rollers 312 and therewith the two strands of template thereon at a proper distance from each other. The two spaced strands of template are subsequently again carried towards each other at their under returning halves near the roller or disk 311.

With the machine described it is assumed that the fastener elements are fixed to the stringer by compressing the jaws of said elements subsequently to the operation of delivering the same to the stringer. The entire machine therefore must work free of any vibrations and should be properly arranged to avoid any objectionable displacement of the fastener elements on the stringer 45, while being preliminarily set thereon.

If it is desired to fix the fastener elements within the machine at least preliminarily, suitable pressure rollers 318 and 319 may act from above onto the fastener elements. It is further assumed in this case that the members 313 which form the template are provided with recesses 320 as shown in Fig. 55 into which the corded edge 46 of the stringer may enter. In this manner the stringer during being pressed against the template members 313 by action of the rollers 318 and 319 will find a proper abutment by having its corded edge 46 pressed into the recesses 320.

According to my invention, that mode of operation is preferred, whereby the stringer is moved into the space between the spread apart jaws of the fastener elements. In this case the parts which serve for reception of the stringer, that is for instance, the combs or lateral parts of the template, need solely to act as an abutment. This is conected with the valuable advantage that it will be possible to use a smaller spread of the jaws of the fastener elements, especially since the pressure which must in this case be exerted upon the stringer for fixing the fastener elements thereto will be distributed over a greater length thereof and may consequently be exerted more conveniently. The aforementioned smaller spread of the jaws of the fastener elements, more especially, has the advantage that deformation of the fastener elements may be avoided thereby. This is illustrated in Figs. 56 to 61 which show in an enlarged scale a fastener element having a large spread. After being mounted upon the stringer the jaws of the fastener elements will be of the conformation shown in Fig. 57. In consequence of the large amount of compression which is necessary in case of a large spread, there will be generated a deformation at the bottom of the elevated part 154 which serves as the locking member proper of the sliding clasp fastener. This deformation as may be seen from Figs. 57 and 58 naturally renders the fastener elements rather unsuitable to act in the proper way as a locking member of the fastener. In the case shown in Figs. 59 to 61 according to which a smaller spread is used, the deformation taking place in case of a larger spread will be successfully avoided by essentially decreasing the amount of compression necessary for fixing the fastener elements to the stringer.

My invention further comprises a modified method of fixing the fastener elements of sliding clasp fastener or ripping closures to the stringer. This modified method consists essentially therein that the fastener elements are fixed to the stringer by pressure with the aid of pressure blocks which are actuated by machine means to compress the jaws of the fastener elements after being mounted on the stringer. These blocks, moreover, are of proper conformation and suitably arranged, in the first place to increase the working capacity of the machine and in the second place to permit continuous operation. At the same time care is taken to firmly fix the fastener elements to the stringer and to prevent displacement of said elements during the process of fixing the same to the stringer.

According to Figs. 62 and 63 a single threaded spindle 282 is provided similar to Figs. 48 and 49 permitting the fastener elements to be kept in proper position within the threads of said spindle. In this case the spindle 282 is assumed to rotate in a direction to move the fastener elements from the right towards the left, while said spindle is rotated within a heap of irregularly positioned fastener elements which is maintained manually or in any other convenient manner at the receiving end of the spindle. During rotation of the spindle those fastener elements which are in proper position with respect to the threads of the spindle are carried with the spindle as far as to a place where the fastener elements may be taken off, while the remaining fastener elements on their way along the spindle may fall off the latter to be again collected. Proper position of the fastener elements within the threads of the spindle is again effected in essentially the same manner as it is done according to Figs. 48 and 49. There is further used an abutment plate 284, the same as in the constructions shown in Figs. 48 and 49.

According to Fig. 64 two spindles 273 and 274 are used which are positioned parallelly and rotating oppositely to each other in accordance with the construction shown in Figs. 45 to 47. In distinction to the construction shown in Figs. 45 to 47, in the present case the jaws of the fastener elements are upwardly directed, and accordingly a ruler 365 is provided underneath the spindles symmetrically thereto, the fastener elements being supported with their heads on said ruler. The ruler 365 is fixed to a supporting plate 366.

According to Figs. 65 and 66 the template consists of a helical spring 367 which may be rotated within a tube 368 surrounding the spring, a slot 369 being provided in longitudinal direction at the underside of said tube. The slot 369 is so dimensioned that the fastener elements 9 may pass therethrough together with their jaws.

In order to bring about adjustment of the fastener elements in a definite position, the several convolutions or threads of the spring 367 are provided at one side thereof with properly dimensioned recesses 370 to permit passage of the elevated parts of the fastener elements therethrough.

The fastener elements 9 are loosely poured into the space within the helical spring 367. Upon rotation of the spring the fastener elements will be carried with and whirled around by said spring so as to gradually collect at the bottom of the tube 369 and assume the position shown in Figs. 65 and 66. The slot 369 will now retain the fastener elements in position and prevent the same against participating in the rotation of the spring, the fastener elements, however, moving in the slot 369 in longitudinal direction with said spring. Those fastener elements which do not come into the position shown in Figs. 65 and 66, that is those fastener elements which have their elevated part directed towards the left, will fall below through the recesses 370 at the convolutions of the spring and may now be collected to be again supplied to the spring. The spring 367 is rotated in the direction shown by the arrow in Fig. 66. The fastener elements that are collected or arranged by the device of Figs. 62 to 66, like those supplied by the devices of Figs. 45 to 49, may be fed to a storage container like that of Fig. 1 from which they are applied in groups on the stringer or mounting tape.

I claim:

1. A machine for delivering the fastener elements of sliding clasp fasteners to a stringer, said machine including a template with gaps therein at proper distances from each other to receive said fastener elements in the spaced relation they are to occupy on the stringer, and an intermediary device whereby a plurality of fastener elements with spread apart jaws are fed simultaneously in a group to the template with their jaws projecting forwardly and entering the gaps of the template.

2. A machine as specified by claim 1, in which the intermediary device includes a storage container adapted for reception of said fastener elements in a plurality of stacks therein.

3. A machine as specified by claim 1, in which the intermediary device includes two storage containers, one of said containers being adapted for reception of the fastener elements one on top of the other and the other of said containers for reception of fastener elements side by side.

4. A machine as specified by claim 1, in which the intermediary device includes two containers which are movable with respect to each other, one of said storage containers being adapted for reception of the fastener elements one on top of the other and the other of said containers for reception of fastener elements side by side.

5. A machine as specified by claim 1, in which the intermediary device includes two storage containers, one of said containers being adapted for reception of fastener elements side by side and the other of said containers for reception of fastener elements one on top of the other, and a fastener supplying mechanism immediately adjacent and discharging into the latter storage container.

6. A machine as specified by claim 1, having an intermediary device in the form of an upper and an under storage container, said under storage container comprising a series of collecting chutes arranged at a distance apart which is equal to the distance between the fastener elements supplied thereto.

7. A machine as specified by claim 1, having an intermediary device in the form of an upper and under container, said upper container consisting of a single supply conduit for supplying the fastener elements to said under container.

8. A machine as specified by claim 1, including a storage container including a plurality of supply conduits for the fastener elements, a stamping device for making fastener elements, said device being immediately adjacent said container permitting immediate supply of fastener elements from said device to a supply conduit of said container.

9. A machine as specified by claim 1, having an intermediary device in the form of a storage container for the fastener elements, and a template including spindles and an endless band.

10. A machine as specified by claim 1, having an intermediary device in the form of storage containers for supplying fastener elements to the template, said storage containers being arranged in horizontal series.

11. A machine as specified by claim 1, having an intermediary device in the form of an upper and an under storage container adapted to supply fastener elements to the template, including rails arranged movably relatively to each other and positioned at the under end of said containers, and means for imparting reciprocating motion to the rails to release said elements piece by piece.

12. A machine as specified by claim 1, having an intermediary device in the form of an upper and an under storage container adapted to supply fastener elements to the template, including rails arranged movably relatively to each other and positioned at the under end of said containers, and means for imparting reciprocating and additional upward and downward motion to said rails to feed and press the fastener elements onto the stringer.

13. A machine as specified by claim 1, having an intermediary device in the form of storage containers one arranged on top of the other and adapted to supply fastener elements to the template, including two pairs of rails mounted movably with respect to each other underneath said containers, means for imparting reciprocating motion to said upper rails and combined reciprocating and downward motion to said under pair of rails for pressing the fastener elements onto the stringer.

14. A machine as specified by claim 1, having an intermediary device in the form of storage containers one arranged on top of the other and adapted to supply fastener elements to the template, including two pairs of rails mounted movably with respect to each other underneath said containers, means for imparting reciprocating motion to said upper rails and combined reciprocating and downward motion to said under pair of rails for pressing the fastener elements onto the stringer, said upper pair of rails having comb-like locking pins adapted to close up said storage containers.

15. A machine as specified by claim 1, having an intermediary device in the form of an upper and an under storage container adapted to supply fastener elements to the template, including rails arranged movably relatively to each other and positioned at the under end of said containers, means for imparting reciprocating motion to the rails to release said elements piece by piece, and further means for imparting upward motion to the stringer.

16. A machine of the character described including a parallellogram of side and end rods, feed spindles operated thereby, the opposite end rods forming part of said parallelogram being mounted on the upper end of said spindles, said spindles being optionally rotatable and axially reciprocable by manipulation on one of the side rods of the parallelogram.

17. A machine as specified by claim 1, having an intermediary device in the form of an upper and an under storage container for the fastener elements, said under container consisting of a plurality of collecting chutes arranged at distances from each other in agreement with the distances of the fastener members, and a supply conduit for supplying fastener elements to both of said storage containers, said conduit being arranged above the upper orifices of said containers, said storage containers and said supply conduit being movable relatively to each other.

18. A machine as specified by claim 1, having an intermediary device in the form of an upper and an under storage container for the fastener elements, said under container consisting of a plurality of collecting chutes arranged at distances from each other in agreement with the distances of the fastener members, a supply conduit for supplying fastener elements to both of said storage containers, said conduit being arranged above the upper orifices of said containers, said storage containers and said supply conduit being movable relatively to each other, two eletro-magnets which may be alternately energized by electric current, a locking mechanism mounted within said supply conduit and controlled by said one electro-magnet by way of a series of fastener elements forming as a whole an electric conductor within said conduit, said conduit consisting to the necessary extent of an insulating material, said other electro-magnet being constructed as a driving means for imparting feeding motion to said supply conduit.

19. A machine of the character described including a support, a distributor, a supply conduit associated therewith, a locking mechanism mounted on the support, a control magnet for said locking mechanism, a feeding member, a retarding member all controlling said support, said retarding member adapted to stop said support in the position at a time reached during forward feeding motion thereof.

20. A machine as specified by claim 19, including a pair of rails extending parallelly to the distributor and supply conduit and fastened to the latter, a feed member co-operating with one of said rails, and a retarding member co-operative with the other of said rails.

21. A machine as specified by claim 19, including a pair of rails extending parallelly to the distributor and supply conduit and fastened to the latter, a feed member co-operating with one of said rails, a retarding member co-operative with the other of said rails, a release member for controlling said feed member as well as said retarding member, said release member mounted upon said rails and adapted to stop action of said feed member and of said retarding member upon contacting therewith, thus permitting return motion of said supply conduit into initial position.

22. A machine of the character described, including a feed member, and a retarding member for a supply conduit, a spring, an electro-magnet for feeding said feed member against action of the spring, for feeding said supply conduit, said feed member being mounted movably and said retarding member being mounted fixedly on the machine.

23. A machine as specified by claim 1, including a supply conduit, an eccentric for imparting feeding motion to said supply conduit, a gear-wheel rotatably mounted on said eccentric, driving means for said gear-wheel, a pawl on said eccentric, said pawl having a slot with a pin therein, and electro-magnetic means for temporarily drawing said pin out of said slot thereby to engage said pawl by spring action with said gear-wheel permitting said eccentric to make one revolution and said pin to again enter said slot during the course of said revolution, thereby again disengaging said pawl from said gear-wheel.

24. A machine as specified by claim 1, including a plurality of chutes, a fastener element feeding device, a threaded spindle, a pawl mechanism co-operable with the threads of said spindle to advance the feeding device to successive chutes, the distances between the threads of the spindle being in agreement with the distances between the chutes.

25. A machine as specified by claim 1, including a plurality of chutes, a fastener element feeding device, a threaded spindle, a pawl mechanism co-operable with the threads of said spindle to advance the feeding device to successive chutes, the distances between the threads of the spindle being in agreement with the distances between the chutes, said spindle being adjustably mounted in longitudinal direction permitting exact adjustment of said spindle to register the feeding device with the chutes.

26. In a machine of the character described, the combination of a supply conduit for fastener elements, and a rotatably mounted member adapted to enter said supply conduit from the side thereof, said member being locked against continued rotation by fastener elements piled up within said supply conduit, and locking mechanism for preventing further supply of fastener elements to said conduit, said mechanism being controlled by said member.

27. In a machine of the character described, the combination of a supply conduit for fastener elements, with a plurality of adjacent collecting chutes, feed mechanism for feeding said supply conduit from one to an adjacent collecting chute, locking mechanism for preventing further supply of fastener elements from said conduit to said collecting chutes, said feed mechanism and said locking mechanism being positively co-operative with each other.

28. A machine as specified by claim 1, having a template which consists of two endless bands permitting reception of a stringer therebetween and feeding motion of the latter simultaneously with feeding motion of their own.

29. A machine as specified by claim 1, having a template which consists of two endless bands adapted for reception of a stringer therebetween, said machine including a pair of rollers for said endless bands, and means for driving said rollers to feed said bands in stretched condition on said rollers.

30. A machine as specified by claim 1, having a template which consists of two endless bands adapted for reception of a stringer therebetween, said machine including a pair of rollers for said endless bands, means for driving said rollers to feed said bands in stretched condition on said rollers, and means for finally fixing fastener elements to said stringer, while being still within the range of said bands.

31. A machine as specified by claim 1, having a template which consists of two endless bands, and a rail arranged intermediate the two halves of said bands, means for actuating said rail from the outside from said bands, said rail adapted to fix fastener elements to a stringer by compression of their jaws round a corded edge of said stringer.

32. A machine as specified by claim 1, including a container into which the fastener elements may be poured in loosely, and means for positioning said fastener elements flat within said container in proper position therein.

33. A machine as specified by claim 1, including a container permitting reception of fastener elements in loose condition therein, one wall of said container being adapted to act as a means for positioning said fastener elements flat within said container in proper position therein.

34. In a machine of the character described, the combination of a distributor, a supply container which may, for instance, be of the form of a second distributor associated with the former, said second distributor adapted to supply fastener elements to a field at the margin of said first distributor which field has remained free of fastener elements.

35. In a machine of the character described, the combination of a storage container for fastener elements, a flexible extension or feeler connected to said container, two distributors, said flexible extension or feeler adapted to contact successively with marginal fields of one of said distributors to release a fastener element from said storage container and to introduce said element into a free marginal field of said distributor.

36. In a machine of the character described, the combination of a supply conduit for fastener elements, a plurality of individual conduits joining said supply conduit, a distributor associated with each of said individual conduits, and a locking mechanism provided at the place of junction of said conduits and adapted to act alternately upon said individual conduits for the purpose of continuously filling said supply conduit.

37. In apparatus for mounting sliding clasp fastener elements on a stringer, the combination of a fastener element source of supply from which fastener elements are supplied in successive rows with the fastener elements of each row in the aligning laterally spaced relation that they are to occupy on the stringer, means whereby said rows are advanced successively in a transverse direction to the mounting position, and a stringer support whereby a stringer is held at the mounting position so as to receive the foremost row of fastener elements on the edge thereof.

38. In apparatus for mounting sliding clasp fastener elements on a stringer, the combination of a fastener element source of supply, facilities which automatically arrange and advance the fastener elements from said source in corresponding successive rows with the elements of each row in the aligning laterally spaced relation that they are to occupy on the stringer, and means for applying the fastener elements of each row simultaneously on the edge of a stringer.

39. In apparatus for mounting sliding clasp fastener elements on a stringer, the combination of a fastener element source of supply from which the elements are supplied consecutively, and means for automatically rearranging said consecutive elements in successive sidewise moving rows.

40. In an apparatus for mounting sliding clasp fastener elements, the combination of a support for holding a stringer so that the edge thereof is exposed for application of the fastener elements thereon, a source of supply from which fastener elements are furnished to the stringer edge location, and means whereby the fastener elements in their passage from the source of supply to the stringer edge location are automatically rearranged in consecutive rows parallel to the stringer edge.

41. In apparatus for mounting sliding clasp fastener elements on a stringer, the combination of means for positioning a stringer with the edge thereof at a fastener mounting zone, and a fastener element source of supply, means providing a row of outlets through which said source of supply communicates at the fastener mounting zone, said outlets being adapted to simultaneously supply a plurality of fastener elements to a stringer edge at the mounting zone.

42. In apparatus for mounting sliding clasp fastener elements on a stringer, the combination of a fastener element source of supply having a row of outlets which are uniformly spaced apart to correspond to the required spacing of the fastener elements on the stringer, means for simultaneously ejecting a fastener element from each outlet and a stringer support which holds the edge of a stringer along the series of outlets in position to receive the ejected fastener elements simultaneously thereon.

43. In apparatus for mounting sliding clasp fastener elements on a stringer, the combination of means for holding a stringer with the edge thereof in a fastener mounting zone, a fastener element source of supply from which fastener elements are supplied, means providing a plurality of spaced outlets to which fastener elements are supplied from said source along the fastener mounting zone, means for simultaneously applying the fastener elements from said outlet onto the edge of the stringer, and means for automatically supplying other fastener elements from said source to said outlets when the elements at the outlets are applied on the stringer edge.

44. In apparatus for mounting sliding clasp fastener elements on a stringer, the combination of a plurality of laterally spaced fastener element magazines each having an outlet in line with and spaced from the other outlets to correspond to the required spacing of the fastener elements on the stringer, and a fastener element source of supply which communicates selectively with the magazines.

45. In apparatus for mounting sliding clasp fastener elements on a stringer, the combination of a plurality of upright fastener element magazines which are spaced apart to correspond to the required spacing of the fastener elements on the stringer, a fastener element source of supply, means automatically operable to selectively deposit fastener elements from said source into the upper ends of said magazines, and means for simultaneously removing the lowermost elements from the magazines and applying them simultaneously on the edge of a stringer.

46. In apparatus for mounting sliding clasp fastener elements on a stringer, the combination of a source of supply from which fastener elements are supplied in successive superposed groups with the fastener elements of each group in the aligning laterally spaced relation in which they are to be mounted on the stringer, a stringer support, and means for simultaneously clamping all of the elements of the foremost group on the stringer edge.

47. In apparatus for mounting sliding clasp fastener elements on a stringer, the combination of a fastener element source of supply, means for separating the fastener elements from said source into a plurality of laterally spaced parallel rows, and means for simultaneously applying the foremost element of each row on a stringer.

48. In apparatus for mounting sliding clasp fastener elements on a stringer, the combination of a plurality of sources of supply from which fastener elements are supplied consecutively, a fastener element channel, and means for selectively supplying fastener elements from either source of supply to said channel.

49. In apparatus for mounting sliding clasp fastener elements on a stringer, the combination of a plurality of sources of supply from which fastener elements are supplied consecutively, a plurality of laterally spaced channels from which fastener elements are simultaneously supplied in the aligning laterally spaced relation in which they are to be mounted on the stringer, and means for automatically replenishing the channels with fastener elements from said sources of supply as fastener elements are removed from said channels.

50. In apparatus for mounting sliding clasp fastener elements on a stringer, the combination of stringer supporting means affording along the edge of the supported stringer spaced recesses to receive portions of fastener elements therein, means having a plurality of outlets corresponding to and opposite the spaced recesses of the stringer supporting means, a fastener element feed which is relatively movable with respect to the discharge outlets for selectively supplying fastener elements to said outlets, and means for applying the fastener elements simultaneously from said outlets onto the stringer edge at the recesses of the stringer supporting means.

51. In apparatus for mounting sliding clasp fastener elements on a stringer, the combination of a toothed stringer holder having spaces between the teeth to receive portions of fastener elements, and fastener supplying means having a plurality of outlets opposite said spaces and means for simultaneously discharging a fastener element from each outlet into the corresponding space of the stringer holder.

52. In apparatus for mounting sliding clasp fastener elements on a stringer, the combination of a stringer holder comprising opposed comb-like members with corresponding teeth between which the stringer edge is engaged, means having a plurality of outlets positioned to discharge respectively into the spaces between the teeth of the comb-like members, and a fastener element feed which is relatively movable with respect to said outlets to selectively supply fastener elements to said outlets.

53. In apparatus for mounting sliding clasp fastener elements on a stringer, the combination of a plurality of parallel magazines having outlets from which fastener elements are simultaneously supplied in the aligning spaced relation in which they are to be mounted on the stringer, and fastener supply means automatically operable to maintain a plurality of fastener elements in each magazine.

54. In apparatus for mounting sliding clasp fastener elements on a stringer, the combination of means for holding a group of fastener elements in the aligning laterally spaced relation in which they are to be mounted on the stringer, a stringer support relatively movable lengthwise of said group of fastener elements for locating the stringer in position to receive said group of fastener elements thereon, and means for simultaneously applying the fastener elements of said group on the edge of a stringer on said stringer support.

55. In apparatus for mounting sliding clasp fastener elements on a stringer, the combination of a plurality of chutes, a device which furnishes fastener elements consecutively with spread apart jaws, transferring means through which the fastener elements are supplied jaws foremost from said device to the chutes, said means and chutes being relatively movable so that said means communicates optionally with the various chutes, a stringer support for holding a stringer at the delivery ends of the chutes, and means for simultaneously transferring the endmost elements of all the chutes onto the edge of the stringer.

56. The method of applying sliding clasp fastener elements on a stringer, which comprises arranging and advancing the fastener elements in successive sidewise moving rows toward a mounting position, supplying stringer lengths successively to said mounting position with the edges thereof presented toward the foremost row of fastener elements, applying the rows of elements consecutively onto the edge of the corresponding stringer lengths, and thereafter clamping the elements of the row onto the edge of the stringer length.

57. The method of applying sliding clasp fastener elements on a stringer, which comprises providing a quantity of fastener elements with spread apart jaws, arranging and advancing said elements in successive sidewise moving rows so that the openings between the jaws of the elements of each row are in alignment at the front of the advancing row, supplying stringer lengths successively to a position in front of the foremost row of elements so that the edge of the stringer length is presented toward the aligned openings between the jaws of said row of elements, and applying the rows of elements successively on the stringer lengths so that the jaws of the elements of each row straddle the edge of the stringer.

MARTIN WINTERHALTER.